United States Patent [19]

Wang et al.

[11] Patent Number: 5,802,361
[45] Date of Patent: Sep. 1, 1998

[54] METHOD AND SYSTEM FOR SEARCHING GRAPHIC IMAGES AND VIDEOS

[75] Inventors: Katherine Wang, San Jose; James Normile, Woodside, both of Calif.

[73] Assignee: Apple Computer, Inc., Cupertino, Calif.

[21] Appl. No.: 315,965

[22] Filed: Sep. 30, 1994

[51] Int. Cl.$^6$ .............................. G06F 3/14; G06F 3/147
[52] U.S. Cl. ..................... 395/600; 395/161; 395/156; 395/155; 382/56; 382/55; 379/202; 364/419; 358/136; 358/13
[58] Field of Search .................. 395/600, 161, 395/155, 156; 379/202; 382/56, 55; 358/136, 13; 364/419

[56] References Cited

U.S. PATENT DOCUMENTS

| | | | |
|---|---|---|---|
| 4,847,677 | 7/1989 | Music et al. | 358/13 |
| 5,202,828 | 4/1993 | Vertelney et al. | 364/419 |
| 5,262,856 | 11/1993 | Lippman et al. | 358/136 |
| 5,267,322 | 11/1993 | Walch et al. | 382/55 |
| 5,321,776 | 6/1994 | Shapiro | 382/56 |
| 5,345,550 | 9/1994 | Bloomfield | 395/156 |
| 5,408,603 | 4/1995 | Van de Lavoir et al. | 395/161 |
| 5,414,809 | 5/1995 | Hogan et al. | 395/155 |
| 5,434,913 | 7/1995 | Tung et al. | 379/202 |

Primary Examiner—Thomas G. Black
Assistant Examiner—Cheryl Lewis
Attorney, Agent, or Firm—Fenwick & West LLP

[57] ABSTRACT

A system and method for searching images includes a low level analyzer for processing image data in a plurality of images into side information files, the image data of each side information file pertaining to a particular statistical or perceptual abstraction of the images, such as motion, color, texture, segments, and the like. A user interface allows a user to graphically construct a search inquiry with icons representing image attributes corresponding to the image data in the side information files. A search inquiry may include complex boolean expressions, and custom image attributes may be created to represent useful search inquiries. The image attributes of a search inquiry may also be ranked. A high level analyzer parses a search inquiry to determine the image attributes contained therein, and analyzes the image data of the side information files to determine a similarity measure for each image with respect to the search inquiry. The high level analyzer orders retrieved images according to their similarity measures, and provides them to a image display controller for display. The user may designate selected images that are acceptable matches for the search inquiry. The high level analyzer will then redetermine the rankings and image attribute values, and either reorder previously retrieved images, or perform a new analysis of the image to retrieve a new set of matching images.

36 Claims, 20 Drawing Sheets

METHOD AND SYSTEM FOR SEARCHING GRAPHIC IMAGES AND VIDEOS

BACKGROUND

1. Field of the Invention

The present invention relates generally to the field of computer based image analysis, and more particularly to methods for searching images having particular attributes and classifying images according to their attributes.

2. Description of the Background Art

There is currently a growing demand for computer systems that can produce, edit, and manipulate graphic images, and in particular, for systems that can create, edit, or manipulate digitized video images. This demand is generated by several market influences and consumer trends. There has been, and will continue to be, steady growth in the multimedia marketplace for computer-based products that integrate text, audio, graphics and increasingly video, for educational, entertainment, and business purposes. Also, the use of video for educational or business presentations and for artistic or personal applications has become increasingly popular as the costs of video production equipment has fallen. Products ranging from videogames to computerized encyclopedias to computerized training guides now commonly employ digitized video to entertain, educate, and instruct.

These consumer trends are matched by various technological advances that have made widespread the use of video for computer based applications. Equipment to digitize video at high speed and quality has allowed software designers to integrate video into commercial software products such as computer games, and has allowed individual computer users to incorporate video into business presentations or other presentations or other similar projects. Improvements in telecommunications and network technologies, such as increased transfer rates, bandwidth, and the like, have made realistic the opportunity for computer users of all types to access on-line libraries of video with acceptable speed and quality.

The rise of desktop video production, including the development of video compression standards such as MPEG, have reduced the cost of video production systems, making pre- and post- production systems accessible to more users and businesses. There are now available a number of software products for multimedia authoring that handle video, graphics, audio, animation in the development environment. Such technologies have been made possible by increases in microprocessor power coupled with dramatic reductions in cost. Personal computers now offer performance previously found only in engineering workstations, or mainframes.

In addition to computation power and sophisticated software, improvements in storage capacities and compression technologies have increased the ability to store digitized video, which typically requires large storage needs. Uncompressed NTSC quality video requires 15 Mb per second for 30 fps video, or almost 1 Gb for a minute's worth of video. The MPEG standard for video image compression provides for a 40:1 compression ratio, allowing a hour's video footage in about 1.3 Gb of storage capacity. Compression also facilitates network access, and thus the developments of video libraries that allow user to select and retrieve video footage in real, or near real time.

All these factors have produced a demand for systems and products that aid the storage, identification, and retrieval of graphic images and video. This is because designers of multimedia software products, computer graphic artists, and even individual users, often have extensive libraries of digitized photographs, digitized video, or other computer generated graphic images, for incorporating such materials in multimedia products. Thus a designer may have hundreds, or thousands, of images of people, animals, urban settings, landscapes, sporting events, or any other category of images, and may have hours of similarly diverse video footage, all useful for creating multimedia presentations. Similarly, with the emergence of desktop video production, video producers will typically develop extensive libraries of video for use by themselves, or others, to aid in the creation of new works. Other businesses that have existing libraries of video, and that generate large quantities of video, such as television stations, film studios, and the like, will eventually produce and store increasing quantities of video using computers and mass storage devices.

To effectively use a library of images or video, the software designer must be able to retrieve an image or video according to certain visual attributes or characteristics in the image. For example, the designer may need an single image or even video footage of a sunset over a ocean shore for a given project, and would need a way to locate that image from many other images, without having to review many hours of video, or numerous photographs that may or may not match the desired visual characteristics of the image. In the past, such retrieval was manually performed. For computer based image retrieval to be useful, some type of image analysis and classification of the visual characteristics of the images is necessary in order to speed up the retrieval process and make computer based storage an effective and efficient tool.

Image retrieval and analysis can be broken down into three related types of activities: searching, summarizing, and classifying. Searching is the review of images or video to identify and retrieve an image or a sequence of images meeting a set of specified criteria or attributes. Classification is related to searching, but is the more general process of categorizing images or video according to the various visual attributes they include. Once classified, images or video may be more easily searched. Summarizing pertains mainly to video, and involves the review of a video to identify and describe each of the scenes in the video, and again may facilitate searching. Central to each of these operations is an analysis of the visual attributes of the image.

The visual attributes or statistical qualities of images have been extensively researched, and there are many techniques for determining various aspects of an image, such as density and distribution of its colors, the presence and degree of motion between two images, the presence and position of distinct objects, and the like. However, most of these techniques have been developed for use in two principal areas, compression techniques for communicating or storing images and video, and pattern recognition techniques for determining whether a particular image matches a given reference, such in industrial part inspection.

These various image analysis techniques have not previously been used for searching, summarizing or classifying images. Rather, searching and classifying images is typically based on storing images in a database with descriptive text annotations. The designer then searches by inputting a text description of an image and attempting to locate images that have a matching text description. There are numerous problems with using this approach to search or classify images and video.

First, a human observer must view each image in the database. This is an extremely time consuming process, especially in a database that may contain thousands of images, and must be repeated for each image added to the database. Second, during viewing, the observer must decide which visual elements of an image are significant and worth describing. This subjective judgment may overlook various image details that may later be part of image characteristics for which the user is searching. Thus the observer may not note or descriptive specific objects in the background of image, or implicit elements of an image or video such as panning or zooming. Even in still images, the user may overlook significant colors, shapes, the presence of persons, or other elements. As a result of these subjective judgments, the observer's description of the image may be either too general (describing the sunset over the beach as merely a "sunset") or too specific ("sunset on The Strand"), and thus a later user's text entry to describe the desired image may fail to retrieve this image, or may retrieve many images, each of which must be individually reviewed to determine if they are "sunset" images.

Other image databases merely provide the user with large galleries of miniatures, or reduced size, samples of the images in the database which the user must review himself to locate a desired image. While such databases, as the previous ones, may allow the user to create various files representing different categories of images, such as faces, animals, etc., the user must still review the applicable file in order to locate a particular image. Again, this may be a time consuming process.

Searching video even more difficult and time consuming. In order to categorize a video, an observer must view the entire video, noting its various contents, such as different scenes, and when each occurs, along with a description of each scene and aspects significant for later retrieval. Again, not every feature will be noted by the observer; this is an even more significant problem for video since there is typically more "content" to a video in terms of varying images than a single photograph, and thus a limited text description of video is likely be inadequately descriptive of all of the content. Further, to retrieve an particular scene or image from a video typically requires the viewer to view the video up to a desired location, again, a time consuming process. None of these approaches use computer based analysis of the images to search and locate a desired image.

One of the contributing factors to the currently limited ability to search for specific visual attributes in images or video has been the lack of a suitable interface for allowing a user to describe without text various visual attributes to be located in the desired image. In the absence of a "visual language," a user must describe his desired image attributes with text. However, textual descriptions are may be inadequate because they may not precisely match the descriptions in the database.

More importantly, a user may not be able to describe the desired features due to the inadequacy of language to describe various concepts, and the inability of the image retrieval system to handle complex syntactical expressions. For example, most modern computer systems can handle a color range of over 16 million colors. There is an obvious deficit of words for describing all of these colors, leaving most users with the names of colors in the rainbow, such as "red", "orange," "yellow," "green," "blue", "violet," and "black," "white", and "gray," with modifiers such as "light," "dark," etc. These terms are inadequate to describe images that contain a gradient of colors, as found in a sunset for example, or a rich variety of subtle colors and hues. Text descriptions are also inadequate to describe textures, complex patterns, motion or combinations of all of these visual attributes. Describing textures, motions and the like is a uniform manner is difficult and time consuming, and consistent descriptions of similar images is unlikely.

In addition, current image systems are unable to parse complex semantic relations or syntactic expressions. For example, typical system are unable to handle textual description of spatial information in an image, such as locating an image with a "red square to the left of a blue triangle." Further, conventional systems cannot handle logical relations, such as an inquiry for an image containing "a red square and either a blue triangle or a black circle." With respect to video, no currently available system allows a user to specify a search for a distinct sequence of scenes in a video, each having specified visual attributes. Any attempt to enhance with parsing and syntactic capabilities to allow such search inquires is likely to produce an unwieldy system, where the user would have to input an entire paragraph just to describe an image.

Accordingly, it is desirable to provide visual language that allows a user to specify any number of visual image attributes, such as colors, shapes of objects, motion characteristics, and the like, and a method of searching that can locate such attributes in an image or video. Such a method should be able to extract meaningful information from an image or video that corresponds to a semantic description of the image. It is further desirable to provide for relational searching of attributes including logical and spatial relationship of attributes in an image or video. It is further desirable to allow a user to define additional image attributes based on existing ones, and to define sequences of attributes for retrieving sequenced scenes in a video.

It is further desirable to provide a user interface that facilitates the creation and modification of a search inquiry using visual attributes. The user interface should allow for the simple and rapid specification and modification of an image attribute to be located. The operation of the interface should be intuitive and flexible to aid novice users in the use of the system.

SUMMARY OF INVENTION

The invention disclosed herein provides a variety of methods for searching, both still images and images contained in video. In addition, the invention provides a user interface for constructing search inquiries for using during searching, and for displaying retrieved images. The method of searching for images relies on the presence in the image of image attributes that describe various statistical qualities in the image, such as average distribution of color, motion, or the like, and that can be mapped to perceptual qualities in the image, such specific color or range of colors, the presence of a moving object, the appearance of specifically shaped object in a given area of the image or images, or the differentiation of a video into separate scenes. Accordingly, the method provides a low level analysis of each image in the plurality of images, be it in a database of discrete images, or a set of images forming a video or any combination thereof, to extract particular statistical measurements of each image. The analysis provides a set of side information files containing the image data for each image. This analysis is preferably done prior to actual searching to increase search and retrieval speed.

When an image is to be retrieved, a search inquiry including at least one image attribute is formed by a user. The user may provide multiple image attributes, each representing different image attributes to be retrieved in an image For example, the user may specify an image attribute representing a range of colors between red and orange, an image attribute representing a particular texture, and an image attribute representing a human face. Various parameters of each image attribute can be modified as desired. The user may also specify logical relationships between any selected image attributes, such as the texture and color attributes occurring together to form a specifically textured colored portion of the image. The user may also specify spatial relationships, such as the color image attribute appearing in the upper portion of the image.

In order to aid in future searches, the user may define new image attributes by combining existing image attributes. Such new image attributes can represent complex semantic constructs. For example, combining an image attribute for a color range of light to medium blue, with a smooth texture image attribute, and positioning these primitives in the upper portion of an image could result in a new image attribute representing "blue sky." From then on, the user could use this "blue sky" image attribute to search for images having a blue sky. Further, the user can specify sequences of image attributes for locating successive scenes in a video. The user may also rank the priority of each image attribute to indicate that some image attributes are more important than others; this causes the system to analyze and display the retrieved images (where there are many images containing the selected image attributes) based on the rankings.

The relevant image attributes of each of the images are then analyzed to identify matches in the desired image attributes in the images, and images having the image attributes provided in the inquiry are retrieved. The analysis, for example, may compare motion vectors present between two images in a video to determine if a moving object or camera pan is present in order to determine if its motion matches an input motion image attribute.

During retrieval, the ranking of each image according to the ranking of the selected image attributes in the search inquiry is determined, and the images analyzed and displayed according to their rankings in either a spatial order, such as a grid layout, or a temporal order, one after another. Once the ranked images are displayed, the user can specify which images are satisfactory matches for the search inquiry and which are not, whereupon a correlation between the image attributes in the search inquiry and the designated images is determined, the ranking for the image attribute readjusted according to their individual correlations, and the search repeated with the new rankings. This adaptive process will allow the user to quickly identify the desired image or images. The user may again search the images for image attributes whose parameters have been reset to match the image attributes of the images indicated by the user as being satisfactory or best matches.

The invention also provides a novel user interface for performing the search method described above. The user interface comprises a method of interacting with a computer to construct search inquiries. The method includes providing on a display to a user a number of distinctive icons, each icon representing a predefined type of image attribute. By way of example, there may be provided a color image attribute for use in searching for particular colors in an image, or a motion image attribute for searching for relative movements or pans between images, or a face image attribute for searching for a human face in an image. The user may modify the parameters of any image attribute, whereon the icon representing the modified image attribute will be updated to visually reflect the changes. Thus, if the user modifies a color image attribute to represent a limited color range of light blue to medium blue, the icon for that attribute will updated to visually show this range. As above, the user may define various logical and spatial relationships between selected image attributes, and may rank such attributes.

The invention also comprises a method for identifying a particular image in an input image, where the scale of the images is not equivalent. In this method, an input image is projected onto a set of eigen-images that represent the particular image at a fixed scale. The projection produces a set of weights. These weights are applied to the eigen images to reconstruct the input image. The input image is then compared with the particular image, and a reconstruction error is taken, and used to rescale the input image. The rescaled image is reprojected, and then reconstructed as before, and another reconstruction error is taken. The correction direction of scaling is determined by which direction reduces the reconstruction error. The process is repeated until the reconstruction error is minimized. The minimum reconstruction error is then used to determine if the particular image is present in the input image.

The invention further comprises a system for searching images, including a storage device that stores a plurality of images to be searched, a display for displaying the images, a low level analyzer that analyzes the images to produce various types of image data representing statistical or perceptual qualities in each image. A user interface controller provides a user interface for constructing a search inquiry using image attributes. A high level analyzer analyzes the search inquiry to determine the image attributes and their parameters contained therein, and then analyzes the image data of the images to determine how similar the image data of an image is to the image attributes, to retrieve the images that are substantially similar to the image attributes of the search inquiry.

DESCRIPTION OF THE PREFERRED EMBODIMENT

I. Overview of Image Search System

Figure 1:
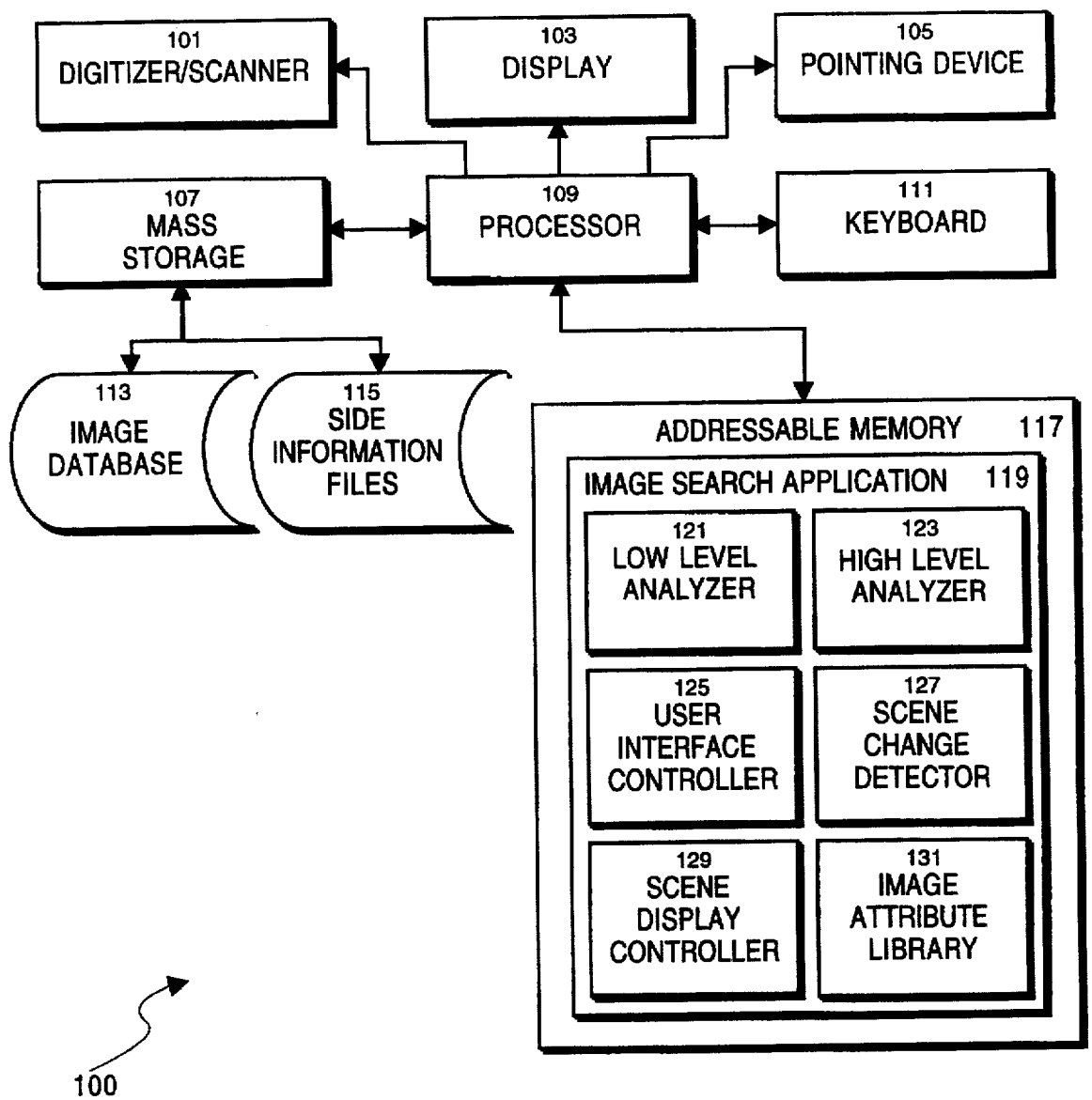
FIG. 1 is a pictorial illustration of one embodiment of a system for searching for images.

Referring now to FIG. 1 there is shown one embodiment of a computer system for effecting the methods of the present invention. The image search system 100 includes a processor 109 operatively coupled to a display 103, a pointing device 105, a keyboard 111, a mass storage device 107, and an addressable memory 117. In the preferred embodiment the processor 109 is from the 68000 family or PowerPC family produced by Motorola, Inc., and used in the Macintosh™ brand of personal computers manufactured by Apple Computer, Inc. The mass storage device 107 is for permanently storing images including graphic images, digitized photographs and digitized (or digitally produced) video images, and is conventional design, with sufficient capacity, preferably in excess of 500 Mb, to store a large number of digitized images. The images may be stored in the mass storage device 107 in an image database 113, or other suitable application for easy retrieval and indexing. Images are input into the image database 113 by digitizing them with the digitizer 101, or by composing them in conventional graphic design or video production applications. The display 103 is also of conventional design and should have sufficient resolution to display at least 640×480 pixels, preferably with at least 16 bit color depth. The display 103 is also used to display a user interface to the image search system 100, the user interface provided by the user interface controller 125. The pointing device 105 may be a mouse, a stylus, a touch-sensitive screen, or a voice activated command processor, or the like device, for providing inputs to the processor 109 via the user interface controller 125, such as for controlling a cursor and other elements provided in the user interface. A keyboard 111 is also provided for inputting commands to the image search system 100.

The addressable memory 117 stores an image search software application 119 that controls the processor 109 for effecting the methods of the present invention. The image search application 119 includes a low level analyzer 121 that analyzes the images in the image database 113 and creates the side information files 115 containing image data extracted from the images in the image database 113. The side information files 115 may be stored with the images themselves or may be stored separately. An image attribute library 131 maintains a predetermined set of image attributes for use in constructing a search inquiry, and further maintains any new image attributes defined by the user.

A high level analyzer 123 is employed for analyzing the side information files 115 in response to a search inquiry input by the user. The high level analyzer 123 analyzes the image data in the side information files 115 to determine which images or video scenes in the image database 113 are substantially similar to the image attributes in the search inquiry. The high level analyzer 123 also determines the ordering of the images based on the evaluation of the retrieved images, including any ranking values provided by the user as part of the search inquiry. The high level analyzer 123 provides the retrieval information to the image display controller 129, which retrieves and displays the designated images on the display 103, and further manages the playback of images in video scenes. The user interface controller 125 provides a graphical user interface on the display 103 and monitors inputs from the keyboard 111 and pointing device 105 for constructing search inquiries in the user interface and other operations with the image search application 119. Example portions of the graphical user interface provided by the user interface controller 125 are shown in FIGS. 5 through 9. The operation of the various elements of the user interface will be described in conjunction with the various methods effected by the image search system 100.

II. Overview of Search Method

Figure 2A:
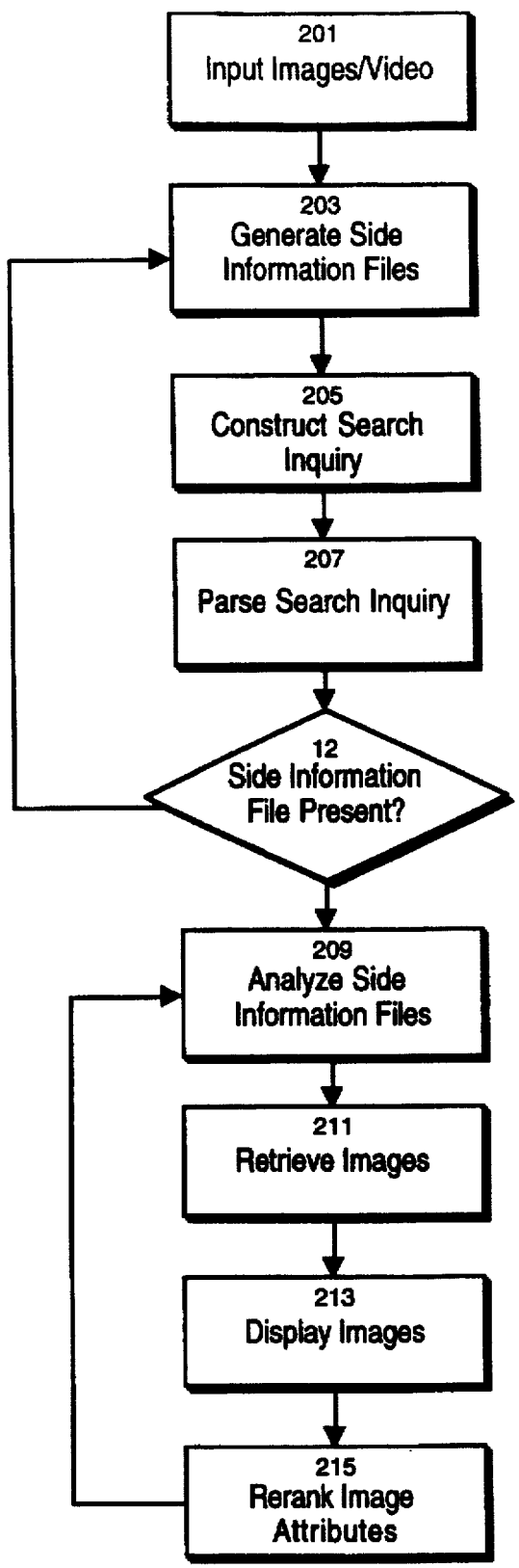
FIG. 2a is a flowchart of the image search process.
Figure 2B:
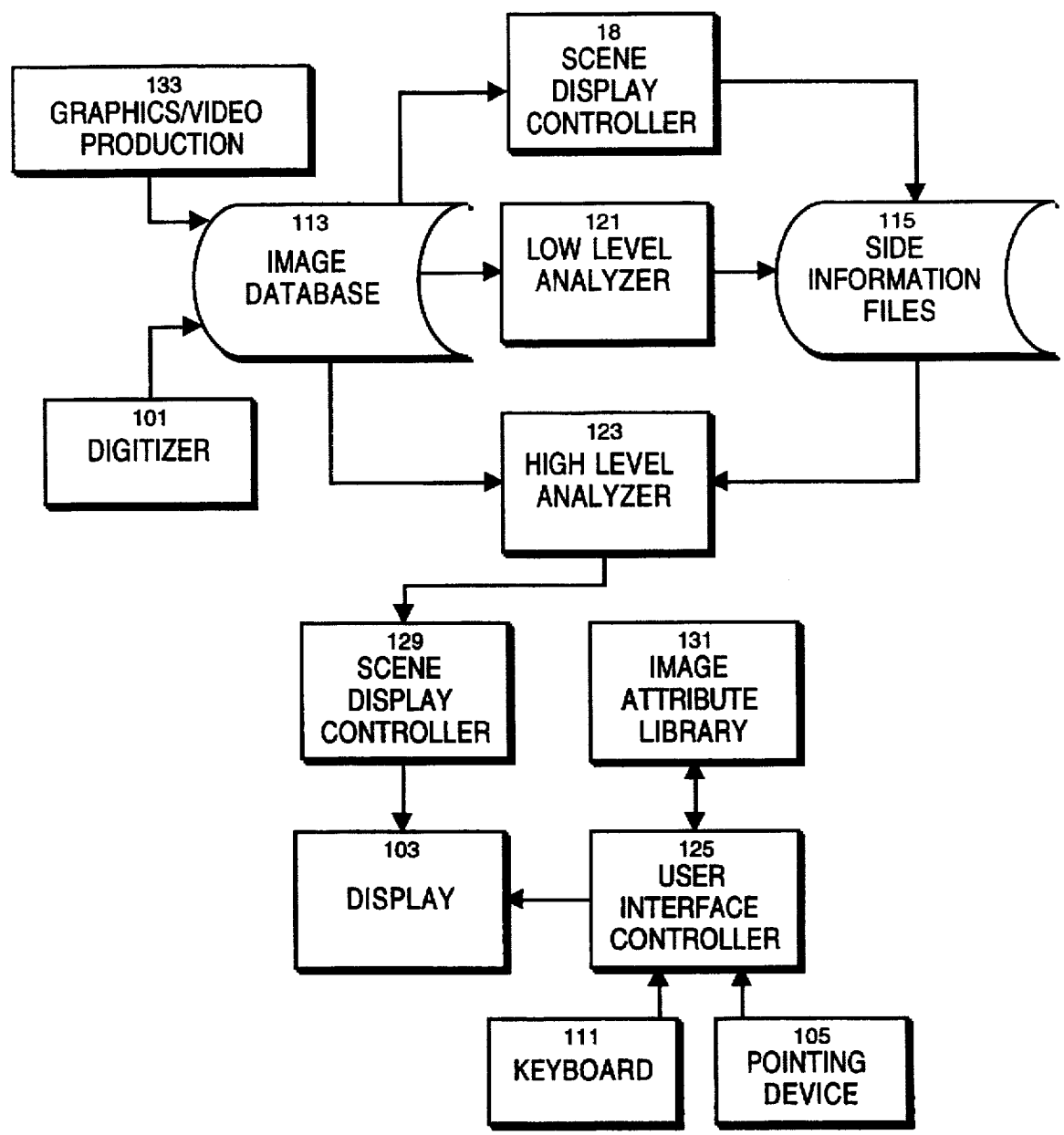
FIG. 2b is a dataflow diagram of the image search process.

Referring now to FIG. 2a, there is shown a flowchart for a method of searching images, including video images and sequences, to retrieve images having certain visual attributes. FIG. 2b shows a dataflow diagram showing the interaction of the various components of the image search system 100 during operation. First, a number of images are input 201 into the image search system 100, either through digitization 101 of printed images or video images stored in conventional video media, or through the generation 133 of images internally with conventional computer graphic, animation, video or similar applications. The input images are stored in the image database 113 for use during the image search process. The input images may be compressed using conventional compression techniques in order to reduce their storage requirements.

The images in the image database 113 are then analyzed 203 for their image data by the low level analyzer 121. The low level analyzer 121 produces for each image, whether an individual image or part of video sequence, a number of side information files 115 each containing specific image data. The purpose of the low level analysis is to extract various statistical abstractions from each image that can be related to semantically meaningful abstractions that a user may use to describe the image. The side information files 115 include files that are specific to the analysis of video, and those that apply to both video and individual still images, as further described below. Video sequences are also analyzed by the scene change detector 127 to determine the location (time code offset or other similar index) of distinct scenes in the video sequence; alternatively, the scene change detector 127 may be called by the high level analyzer 123. The low level analysis 203 is preferably performed prior to actual searching in order to save on computational loads during the search process; when necessary, low level analysis 203 can be performed during searching.

A user then constructs 205 a search inquiry using a number of image attributes to define a semantically meaningful description of a desired image. Preferably the search inquiry is constructed 205 using a graphical user interface provided by the user interface controller 125 wherein each image attribute is graphically represented by an icon, and the search inquiry is graphically constructed by arranging and manipulating icons on the display 103.

Once the search inquiry is constructed 205, the high level analyzer 123 parses 207 the search inquiry to determine the image attribute included therein, and the order in which the corresponding side information files 115 are to be analyzed. If a necessary side information file 115 is not present, the high level analyzer 123 calls the low level analyzer 121, specifying the appropriate file to be created. The high level analyzer 123 then analyzes 209 the side information files 115 to identify those images in the image database 113 that are most similar to the input image attributes. The high level analyzer 123 compares the parameters of each image attribute in the search inquiry to the image data in the appropriate side information file 115. The high level analysis 209 ranks the retrieved images based on the degree to which they match the search inquiry, and any user supplied ranking of image attributes, and provides the this information to the image display controller 125, which retrieves the images from the image database 113, and outputs 213 them to the display, including managing the output of video sequences. The user may then designate which of the retrieved images are satisfactory, whereon the high level analyzer 123 will determine 215 new rankings for the image attributes in the search inquiry, and again search the image database by re-analyzing 209 the side information files 115 on the basis of the new rankings. This process is repeated until the user has located an image or images that is most satisfactory.

III. Operations of the Image Search Method

A. Low Level Analysis and the Generation of Side Information Files

Figure 3:
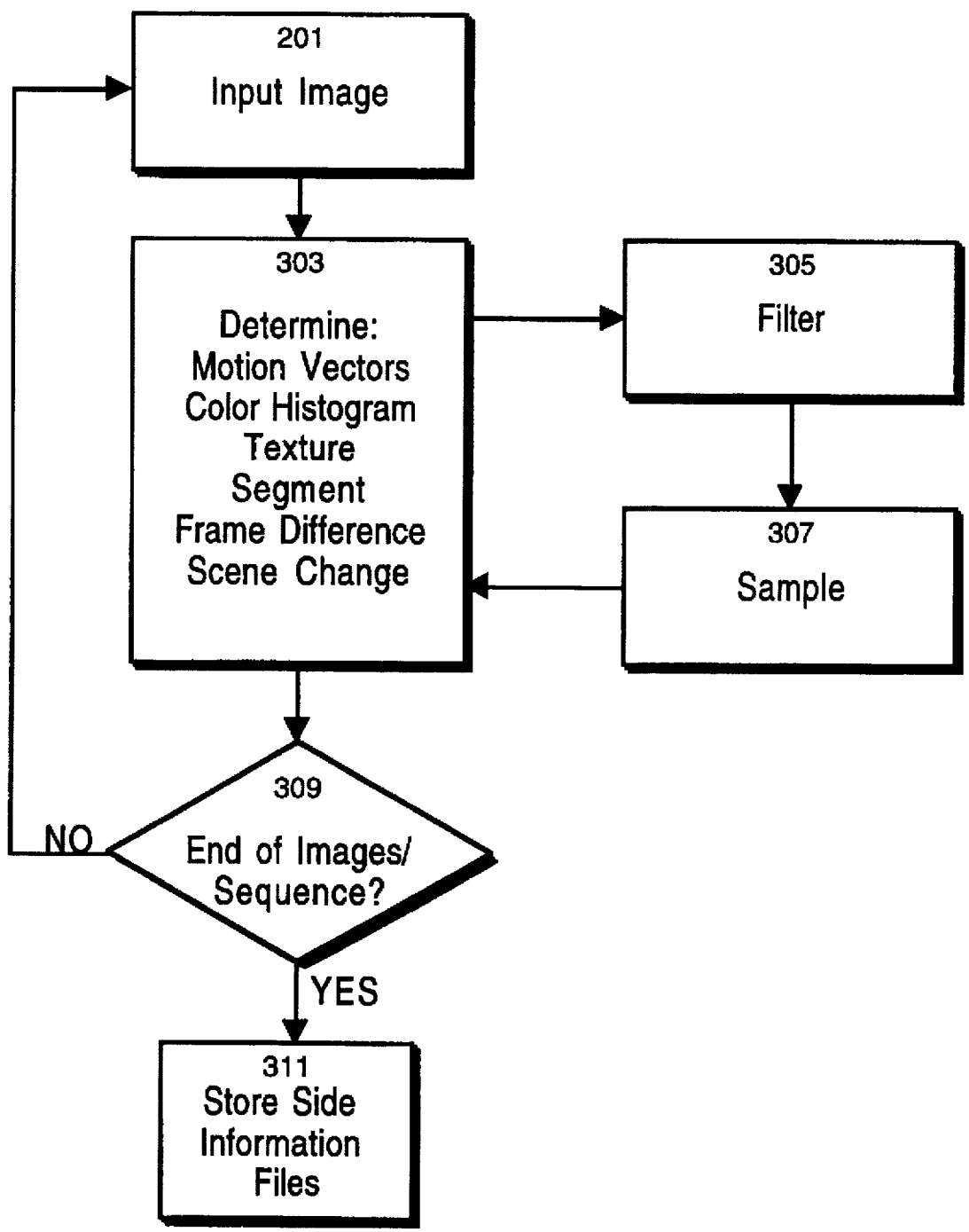
FIG. 3 is a flow chart of the operation of the low level analyzer.
Figure 4:
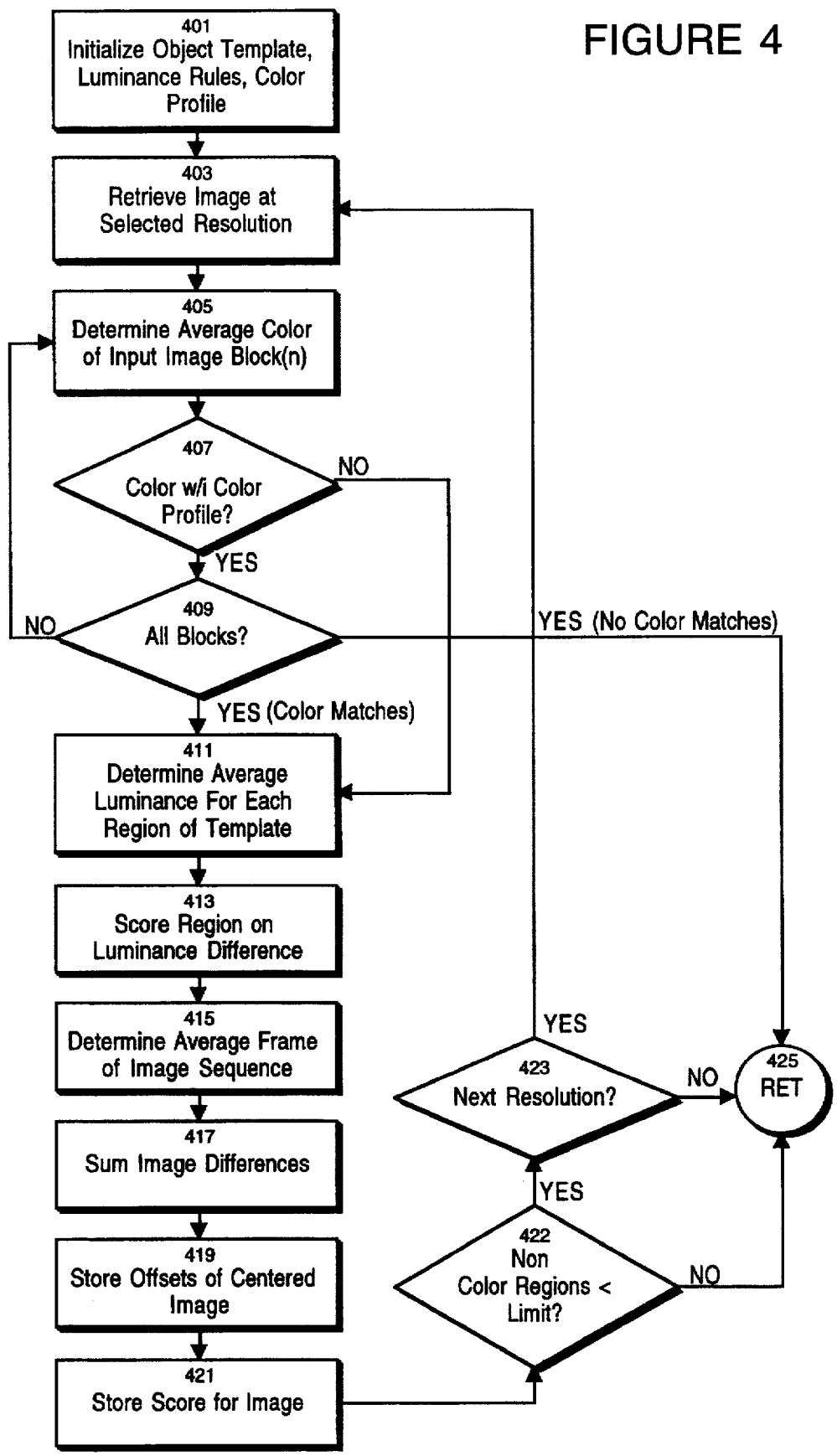
FIG. 4 is a flow chart of the process identifying an object in an image.

The operation of the low level analyzer 121 to create the side information files 115 is illustrated in the flowchart of FIG. 3. First, an image is retrieved 201 from the image database 113 or otherwise input into the system 100. This image may be either an individual still image, such as a digitized photographs, or an image contained in video sequence of images. The low level analyzer 121 then begins analysis 303 of the image to create the image data for the particular side information files.

During the analysis 303 of the image for a given type of image data, the image maybe repeatedly low pass filtered 305 and subsampled 307. Low pass filtering reduces high frequency detail in the image, using either a Quadrative Mirror filter, a Gaussian blur, or other known low pass filters. Subsampling 307 at a number of predetermined sampling factors produces a pyramid of resolutions useful during the image analysis. Typical subsampling factors are 2 in both the horizontal and vertical axes. In the preferred embodiment, four levels of resolutions are used. This pyramidal decomposition reduces the high level analysis 209 search times by allowing search operations to be performed on the low resolution images first, to determine if an image is likely to contain image attribute. If so, then further searches on the higher resolution images can performed. In addition the scale of an input image is more easily determined when a pyramid of resolutions are available for comparison.

The various levels of resolution also result in levels of image data having differing degrees of semantic meaning. For example, a set of motion vectors that is produced when the image is sampled every 8 pixels more generally describes the average direction of motion in an image than a set of motion vectors produced from an image sampled at every pixel, which would describe more particular directions of motion, but not an average direction. With these various levels of resolution, the system 100 is able to quickly compare certain input image attributes with the image data in the side information files 115 to determine a successful match to the search inquiry.

After filtering and sampling at a level of resolution appropriate for the particular image data being retrieved, the low level analyzer 121 determines 303 the image data for each of the side information files 115. For example, repeated sampling is not used with the color, text information or bookmark files, so the image is only sampled 307 once during the creation of these side information files. As the images in input set are analyzed, the image data is stored 311. In the preferred embodiment, there is one side information file 115 for each distinct type of image data, the file containing the image data of that type for all images in the image database 113. Thus there is one motion vector side information file, one color histogram side information file, and so on. Alternatively, there can be a separate side information for each image. The specific side information files 115, and the manner in which they are created is as follows:

For video sequence of images, a motion vector side information file describes motion vectors between each pair of adjacent images in the video sequence. Where there are m images I in a video sequence, there are (m−1) sets of motion vectors for that video sequence. The motion vectors are defined as a set of offsets dx, dy in the horizontal and vertical directions between each block $B_{(x,y)}^n$ at position (x,y) in an image I(n) and a block $B_{(x+dx,y+dy)}^{n-1}$ at position (x+dx, y+dy) in image I(n−1) that is the best match with block $B_{(x,y)}^n$. A block $B_{(x+dx,y+dy)}^{n-1}$ will be the best match that minimizes a distortion measure, such as a luminance difference over all pixels Pn in $B_{(x,y)}^n$, where distortion D(dx,dy) equals:

$$\Sigma |B_{(x,y)}^n - B_{(x+dx,y+dy)}^{n-1}| \text{ for } \begin{matrix} dx \in [-\alpha,+\alpha] \\ dy \in [-\beta,+\beta] \end{matrix}$$

Various conventional methods may be used to identify the set of motion vectors for each image, including exhaustive search, where all combination of block offsets dx, dy within a search range are examined for each block $B_{(x,y)}^n$ to identify the offset having the minimum distortion. Accordingly, in one embodiment of the method for determining the motion vectors between images in a video sequence, the low level analyzer 121 retrieves both the input image and the immediately preceding image. Each image is split up into blocks containing $M^2$ pixels, where M is the number of pixels horizontally and lines vertically in the block; in the preferred embodiment, 8 by 8 blocks are used. For each block B in the current image, the closest matching block is located in the previous image by finding the block having a minimum distortion value, where the distortion is total of the pixel by pixel difference in luminance between the blocks. The horizontal and vertical offsets for the best matching block are stored. This process is repeated for each block in the image, resulting in a set of motion vectors for the image. The motion vector determination is performed at multiple resolutions using resampling, to improve performance during actual searching. Alternatively, the motion vectors can be calculated hierarchically using a single sampling resolution, with the motion vectors for the highest resolution data being computed from lower resolution data. The motion vectors for each image in a video sequence are then stored in a side information file 115.

Also applicable to video sequences only is a frame difference, or prediction error, file. The frame difference side information file describes simple differences between images as a function of some statistical or characteristic measurements, such as the pixel by pixel difference in color value, luminance, or the like. In the preferred embodiment, the prediction error e between each pair of consecutive images is based on luminance differences, and equals:

$$\sum_{i=0}^{Pn} |F_i^n - F_i^{n-1}|$$

Thus the low level analyzer 121 retrieves a current image and a previous image and takes the sum of the luminance differences between location correspondent pixels in each image. This prediction error is stored for each image in a video sequence. Frame differences may also be determined after motion compensation using the offsets realized during the motion vector analysis. Alternatively, because frame differences are a relatively fast computation, they can be computed in real time during actual searching, instead of prior computation and storage as a separate side information file.

The low level analyzer 121 also produces for video sequences an edge map side information file. The edge map side information file indicates in each image the relative placement of distinct edges in the image, and is used to identify distinct objects. The edge map side information file is created by taking luminance values for all pixels in an images and high pass filtering them to remove low frequency luminance values. The remaining pixels are compared to a threshold value, such that pixels exceeding the threshold define a distinct luminance transition, and thus present a distinct edge. From the edge map, a binary map is generated by comparing the edge map at each pixel to the threshold value, and if the threshold is exceed, the binary map at the corresponding pixel is set to 1, otherwise it is set to 0. The resulting binary map is then compressed to reduce storage requirements, preferably using lossless compress techniques, such as runlength coding. This process is repeated for each image in a video sequence, and the resulting binary maps are then stored in the edge map side information file.

Finally, for video sequences, the low level analyzer 121 calls the scene change detector 127, which creates a scene side information file that contains information identifying the time index of scene changes in the video sequence, and a summary file that identifies representative images from each scene in the video sequence. The identification of scene change information is further described in the copending application entitled *System and Method for Summarizing Video Sequences*. Alternatively, the scene change detector 127 can be called by the high level analyzer 123 during the high level analysis 209.

Applicable to both video images and still images are the following side information files 115:

A color histogram side information file includes a color histogram of each image, either still images or those that are part of video sequences. In the preferred embodiment, the color histogram is based on an HSV color space, and represents the frequency distribution of colors by their hue and saturation levels in the image, with brightness values discarded. The HSV color space is used because it closely models the psychological and perceptual experience of color by human observers, and is readily applicable to color display systems, and thus is best suited for allowing users to describe or delineate on a color display color attributes to be located in an image. In the preferred embodiment, the color histogram uses bin segmentation of the color space, with each bin representing 10° of hue and 10% change in saturation, resulting in 360 color bins.

For determining color histograms then, the low level analyzer 121 transforms the input image into the preferred color space, such as YUV or HSV. For each pixel, the hue and saturation level is determined. A two dimensional array representing the range of hues and saturation level is used to store a count for the hue/saturation combination within the ranges specified in the array. The color histogram may be sorted by histogram bin population to provide quick access to the predominant colors in the image. In the preferred embodiment, an image is divided into quadrants, and a separate color histograms is generated for each quadrant, so that a color histogram of the entire image can be constructed from the quadrant histograms. The color histogram for each image, including images in video sequences, is stored in a color histogram side information file.

The low level analyzer 121 also creates a texture side information file that contains information about any textures in each input image or video sequence. A three part analysis is performed by the low level analyzer 121 to first segment an input image into textured and non-textured areas, represent the textured areas using some parameter value, and then assign a global texture description to the texture. Area segmentation is performed on the basis of either statistical information, such as variance, or perceptual features, such as periodicity, or contrast, using known segmentation techniques. It is preferable to use a segmentation method that has computational similarity to the chosen texture representation method. In the preferred embodiment, a statistical method, such as Haralick's spatial gray level dependence method, is used for segmentation.

Texture analysis is then performed using the techniques described in *A new Wold ordering for image similarity;* Rosalind W. Picard, Fang Liu, ICASSP (1994), pp. V-129-132. Briefly, a basis set of eigen textures is generated from a training set of representative textures. The input image is then projected onto this basis set, producing a set of Wold parameters. These parameters are then stored for the textured regions. Using the Wold parameters, a best matching texture in a previously stored database of textures is determined as the texture for each region. If no good match is found, as defined by a prediction error between the original image and a reconstructed image using the textures, then it may be concluded that the input area is not textured, or that further testing is required.

A global texture description, such as "rough" or "smooth" is generated by identifying, as above, the segmented texture and non-textured areas, and using the sum of nearest neighbor pixel (absolute) differences for each area as a measure of how much high frequency information is present in that area. This value indicates "smooth" or "rough" with respect to adjoining areas. Alternatively, the pyramid of image resolutions can be used to take a block by block difference between a low resolution layer and the next finer resolution layer. This measure indicates the impact the low pass filter used above had on the image block, such that if the filter had little effect, the image block is already low frequency and hence "smooth."

In addition to searching for a motion, color, or a texture, a user may desire to locate a specific object or image, such as a human face in the image database 113. Accordingly, a segment side information file is used to identify those images containing various arbitrarily shaped regions representing meaningful objects. The objects are predetermined by the system, or supplied by the user. Thus the segment file may identify regions such as squares, or other simple shapes, or simply large segments of the image having unknown image content. Additionally, the segment side information file 115 may indicate how segments in a sequence of images are related over time. A face side information file 115 specifically identifies those images that contain a human face, for later use in search for particular faces. The low level analyzer 121 is thus used to identify such objects in an image or video sequence, to provide for later searching by the user.

The face side information file is generated as follows. A template for the specific object, here a face, and a set of corresponding luminance rules is initialized 401 by retrieving them from the mass storage device 107. The template segments the face, or other object image, into a plurality of distinct regions, and for each region there is a luminance rule defining a luminance relationship. Also, the low level analyzer 121 retrieves a preset color threshold file contains a color histogram for the human skin color range (or the color range of any desired object). In the preferred embodiment, the color threshold file uses skin color ranges in the HSV color space, with the different parameters weighted to reflect their significance to face identification, with hue weighted 0.50, saturation weighted 0.30, and value weighted 0.20. For objects other than faces, different weightings would be used. Alternatively Munsell tables can be used.

The low level analyzer 121 then retrieves 403 the input image at the lowest level of resolution. The low level analyzer 121 then determines 405 the average color in the image, beginning with a block of M by N pixels. The average color of the block is then compared 407 with the color threshold file to determine if the average color is in the color threshold file, indicating that the block's color is correct. If not, then the low level analyzer tests 409 if all blocks have been evaluated. Blocks may be adjacent, or may overlap. If more blocks remain, the next block is evaluated 405 and tested 407. If all blocks in the image have been tested 407 without finding a color match, then the low level analyzer 121 returns 425, assuming that no face was located.

When a block does match the color threshold file, then the low level analyzer 121 determines 411 the luminance value for each region of the image, according to the template. The image is then scored 413 for "face points" by taking the luminance difference $\Delta Li$ between the luminance value for each region, and the threshold value specified by the luminance rule for each region, and applying it as follows:

$$\text{Face points} = \sum_{i=1}^{N} \frac{[\alpha \Delta Li + (vf)(1-\alpha)]}{k}$$

where $\alpha$ is a weighting factor, $v$ is a maximum luminance value, $f$ is a function of whether the luminance rule for a given region is met, with $f=1$ if it is, otherwise 0, k is the number of regions in the template, and $\Delta Li$ is normalized to the maximum luminance value v. In this way, the luminance difference in each region of the template can contribute at most $\alpha\%$ to the total number of face points for the image.

If the image is part of an image sequence, the low level analyzer 121 determines 415 the average frame or image of the sequence. The difference between each image in the sequence and the average is summed 417, thresholded with a minimal total difference to distinguish random movement from directional movement, and normalized. This results in pixel map of the border around the face or other object, and is used to store 419 the offsets for the center of the image, or some other reference point. The face point score for the image is also stored 421, and is used by the high level analyzer 123 to select images that are most likely to contain face for further searching and matching of particular images. Individual regions are checked 422 for average color, and if the number of regions with large deviations from the HSV skin tone ranges exceeds a preset limit, the image is rejected as a face image. If the image is not rejected, the process is then repeated 423 at each level of resolution for the input image.

The low level analyzer 123 creates the segment file in the same manner, using templates, luminance rules, and color threshold files for each particular image or object to be located.

The low level analyzer 121 also creates a text annotation side information file to store text based information that may be associated with each image or set of images, in a manner similar to conventional image databases 113. The text information can be used conventionally to supplement the search methods of the invention. The low level analyzer 121 creates this file by extracting from a related text field of each image, any text information present therein, and storing it in a side information file.

In addition to all the foregoing side information files 115, a preset color threshold file and a bookmark file exist separately in the mass storage 107. The preset color threshold file includes predetermined ranges of color for specific types of objects. Thus, the file may contain color ranges and relationships representing the range of colors found in human skin, for comparing and identifying images of people. Likewise a set of color ranges and relationships may be stored representing the range of colors for a blue sky, or any other set of colors that are useful for identifying common objects or images.

The bookmark file contains icon based notation for identifying significant information in an image. While viewing images in the image database the user may designate specific images or video sequences with "bookmarks" represented visually by distinctive icons, as further discussed below. These bookmarks may represent any type of significant information that the user wishes to remember, such as video scenes to be edited later, important events, particular persons, and the like. These bookmarks can be incorporated into a search inquiry to define appropriate images for retrieval.

B. Construction of a Search Inquiry and Supporting User Interface

Once all of the images have been analyzed by the low level analyzer 121, the user may begin searching the images for specific visual elements representing meaningful semantic constructs, such a "blue sky" or a "red house" or the like. In order to search for such an element, the user constructs 205 a search inquiry using selected image attributes. As stated above, the image attributes represent semantic abstractions that can be combined to create complex semantic expressions. In the preferred embodiment, the user constructs 205 the search inquiry and selects image attributes using a graphical user interface in which various image attributes are represented by distinctive icons and a search inquiry is formed by graphically manipulating and modifying the icons to alter parameters associated with the image attributes represented by the icons.

One embodiment of a graphic user interface for constructing 205 a search inquiry is shown in FIGS. 5 through 9. Referring to FIG. 5a, the graphical user interface for constructing search inquiries with image attributes includes a user playground 500 and a palette 501 of distinctive icons 503. The user manipulates the icons using a cursor 507 controlled by the pointing device 105. The user playground 500 serves as a graphical design area wherein the user can place the icons 503 to construct a search inquiry.

Each icon 503 in the palette 501 represents a different type of image attribute, each corresponding to one of the specific types of image data stored in the side information files 115. Icon 503a represents a motion image attribute and is used to identify relative motion between two images in a video sequence, including both motion of an object between images, and apparent motion created by pans, zooms, and the like, and corresponds to information stored in the motion vector side information file. Icon 503b represents a color image attribute, and is used in conjunction with the color histogram side information file to locate images having a specified color or range of colors. Icon 503c represents a texture image attribute for locating rough, smooth, and other textures. Icon 503d represents a spatial location image attribute for identifying a relative location in the image of where a second image attribute is to be applied. Icon 503e represents a user definable shape, allowing the user to construct an arbitrary shape that is to be located using the segment side information file. Icon 503f represents a face image attribute, and is used to retrieve images having human faces. Icon 503g is a text attribute, and allows the user to input a text annotation for locating similarly annotated images. Icon 503h represents an import image attribute, that allows the user to open an existing image file and graphically select an image or portion thereof for use as an image attribute. This allows a user to search for images that match an existing image. Icon 503i represents a bookmark attribute for locating images having a designated bookmark annotation. Icon 503j represents a custom image attribute which is used to represent user defined combinations of image attributes, as further described below. The icons represented in the figures are merely illustrative, and other icons connoting the underlying image attributes, or other image attributes can be employed.

To construct 205 a search inquiry in this embodiment of the user interface, the user selects an icon 503 from the palette 501 with the cursor 507, using the pointing device 105 to control the cursor 507. This selection creates an instance of the icon 503. The user then drags the instance of the icon 503 into the user playground 500. An instance of an icon 503 in the user playground 500 represents that an instance of the corresponding image attribute is included in the search inquiry. Unlike conventional graphic design programs, the positioning of an icon 503 within the user playground 500 has no significance to the search inquiry.

Figure 5A:
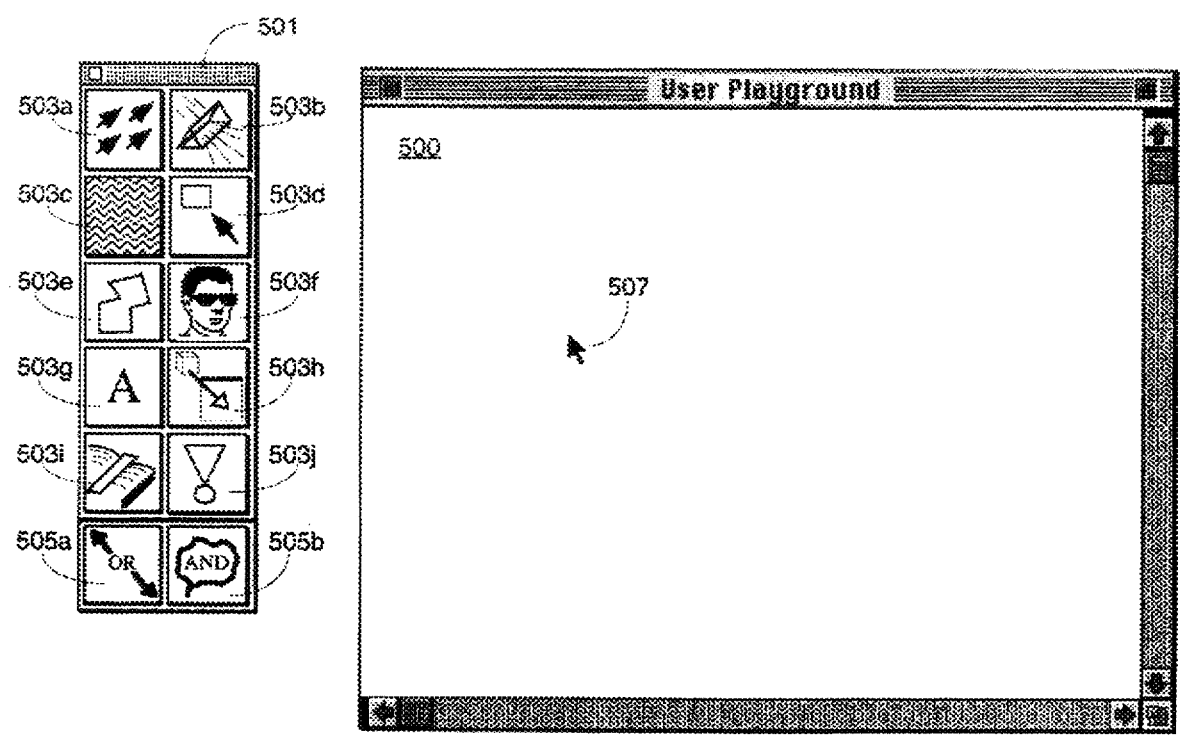
FIGS. 5a–5i are illustrations of parts of the user interface for constructing and modifying a search inquiry using image attributes.
Figure 5B:
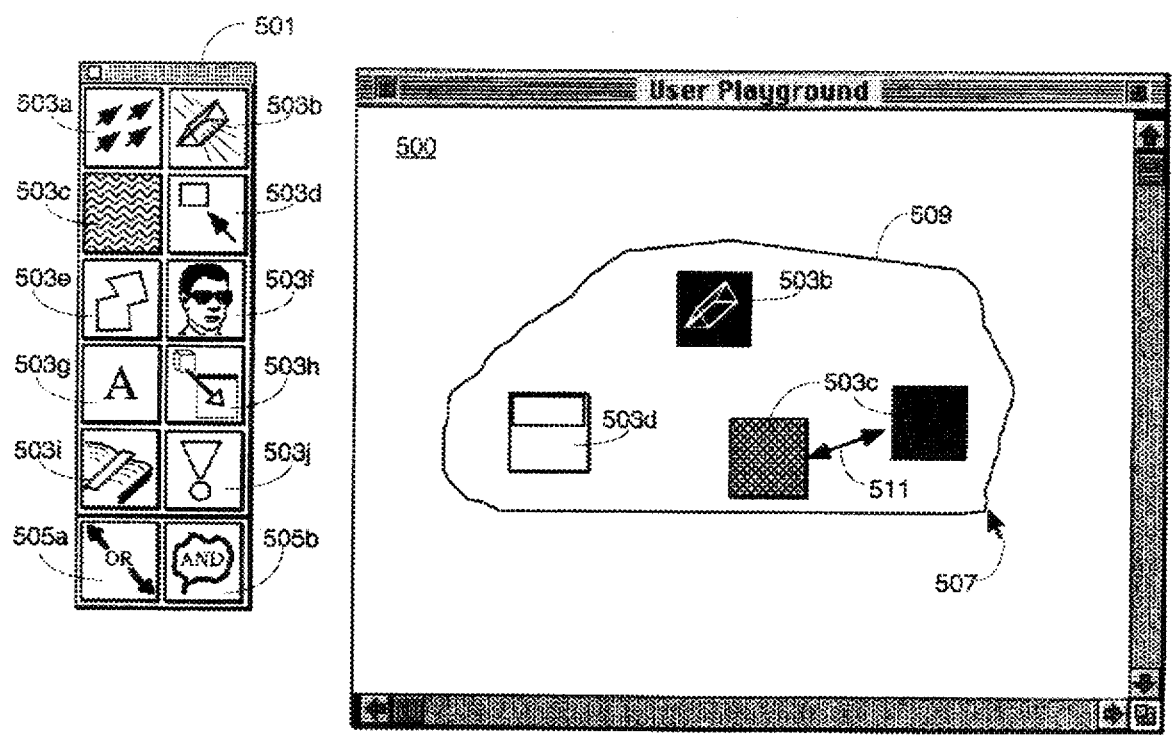

FIG. 5b shows an example of a search inquiry after the user has selected and dragged a number of icons 503 to the user playground 500. In this example, the user has selected an instance of icon 503b to represent a specific color image attribute, two instances of icon 503c to represent various texture image attributes, and icon 503d to represent a spatial location image attribute. Each instance of an image attribute has a number of associated parameters that may be adjusted by the user in order to refine the search inquiry. In the preferred embodiment, the user specifies the parameters after selecting and dragging the icon 503 for the image attribute to the user playground 500, and may adjust the parameters at any later time, for example by double-clicking on a particular instance icon 503. This adjustment is done using modal interface elements conventionally known as dialog boxes, each presenting controls for altering parameters relevant to the particular image attributes. Other interface elements may also be used to adjust the parameters of the image attributes. Examples of the interface elements for modifying the parameters of various image attributes are shown in FIGS. 5c through 5i.

Figure 5C:
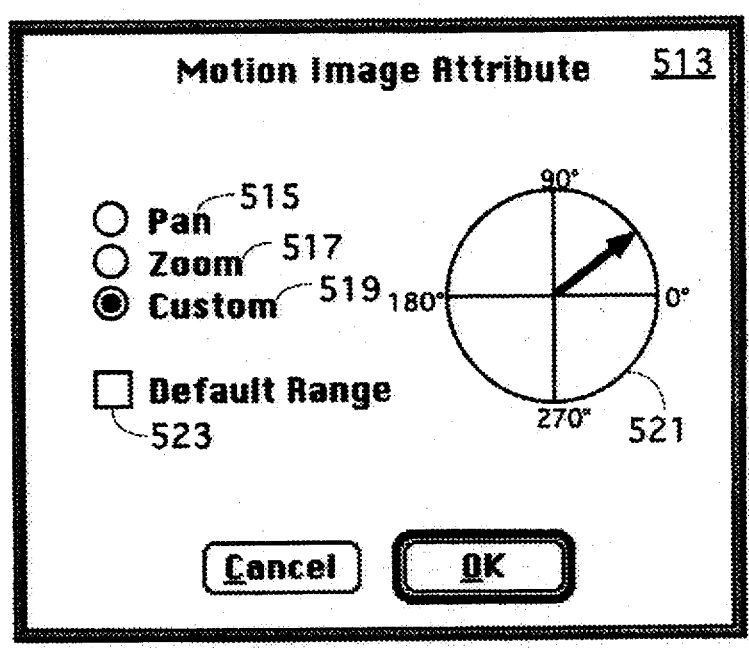

FIG. 5c shows one embodiment of an interface element 513 for modifying the parameters of a motion image attribute. The user is able to specify whether the motion is a pan 515 (a lateral movement), a zoom 517 (close-in movement) or a custom movement 519, wherein the user graphically specifies a direction of movement in the x and y axes, using for example, a directional compass 521 to orient a direction arrow. Alternatively, the user may specify a default direction of movement 523 provided by the system 100. In one embodiment, custom movement directions input by the user are normalized to the nearest 45° value.

Figure 5D:
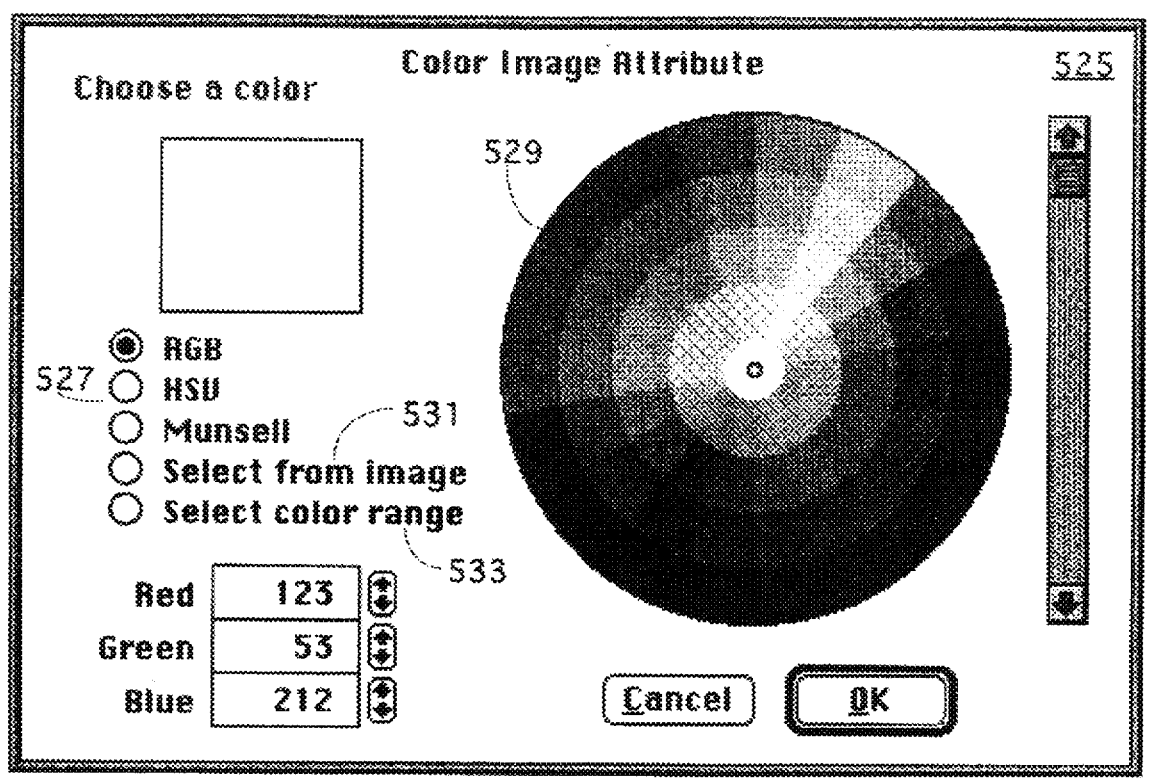

FIG. 5d shows one embodiment of an interface element 525 for modifying a color image attribute. The user may designate 527 one of several color spaces, such as RGB, Munsell, HSV. Once the color space is determined, the user may select a color using a interface device for representing color selection, such as color wheel 529. Alternatively the interface may provide a color palette from which a color is chosen. The user may also specify 533 a range of colors for the color image attribute. The user may also specify 531 colors taken from a sample image; in such case, the user is provided with a means for retrieving an image in the image database 113 or the mass storage 107 known to the user to have the desired color, and then may use various selection tools in the user interface to designate a color to be applied to the color image attribute. In this manner the user may locate further images, particularly images in video sequences that match a color in an existing image that the user is working with in some application.

Figure 5E:
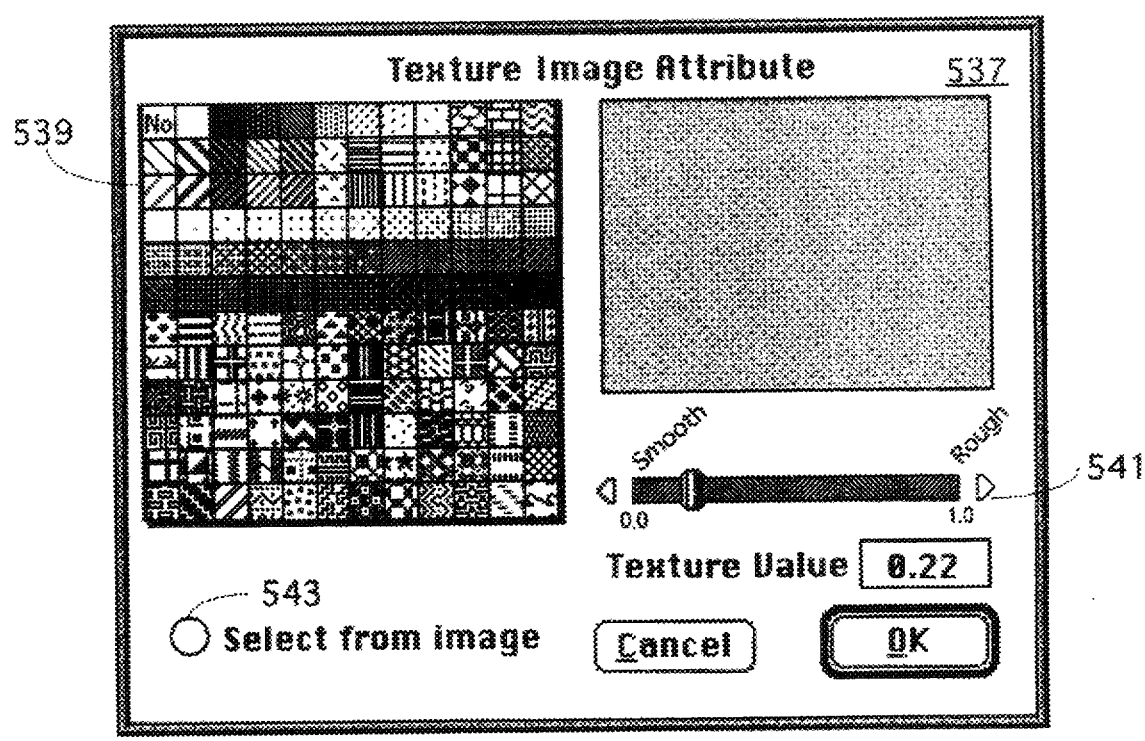

FIG. 5e shows one embodiment of an interface element 537 for modifying a texture image attribute. In the preferred embodiment the user is able to designate a texture from a palette 539 of various textures, which may be modified by the user, or from an existing image 543. In the preferred embodiment, each texture on the palette 539 is from the Brodatz texture collection, and has precomputed Wold parameters. In addition, the user may designate a texture by using a "smoothness" measure that sets a value for a measure of high frequency coefficients; this may be implemented using a slider bar 541, or with direct numerical input.

Figure 5F:
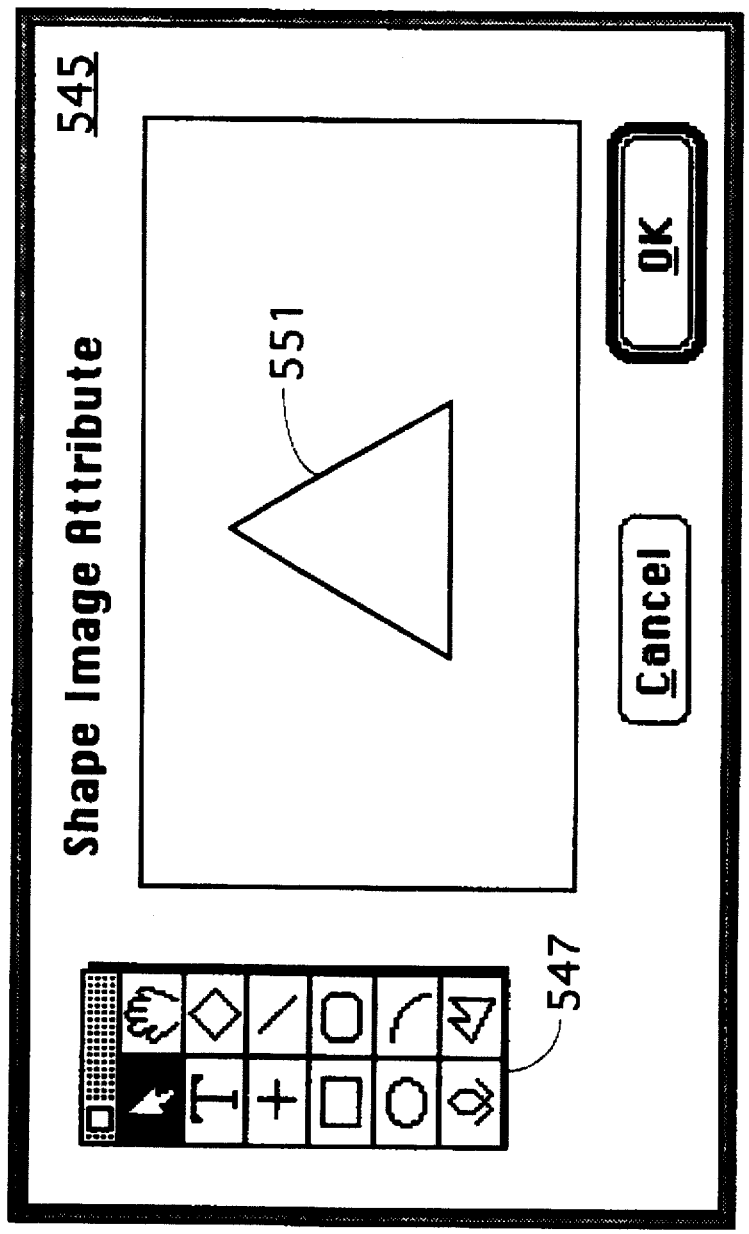

FIG. 5f shows one embodiment of an interface element 545 for modifying a shape image attribute. Here the user is able to create some arbitrary shape 551 having any combination of convex and concave surface, individual lines, or polygons, using a drawing tool palette 547.

Figure 5G:
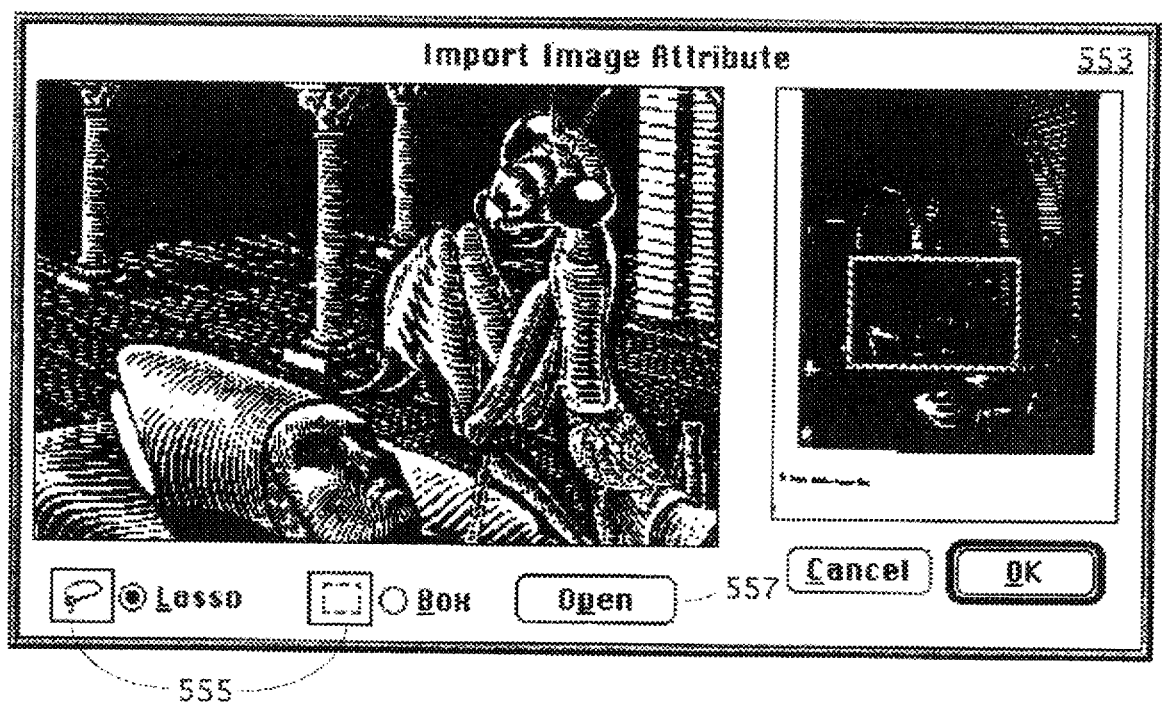

FIG. 5g shows one embodiment of an interface element 553 for modifying the parameters of an imported image attribute. When an instance of the imported image attribute icon 503h is selected, the system 100 provides a means 557 for selecting an existing image file in the image database 113 or mass storage device 107. Once the file is retrieved, it is displayed to the user. The user may then use conventional selection tools 555, such as lasso or selection box, to select the desired part of the image for use in the imported image attribute. This feature allows the user to search the image database 113 for images that contain objects or images similar to those included in existing images.

Figure 5H:
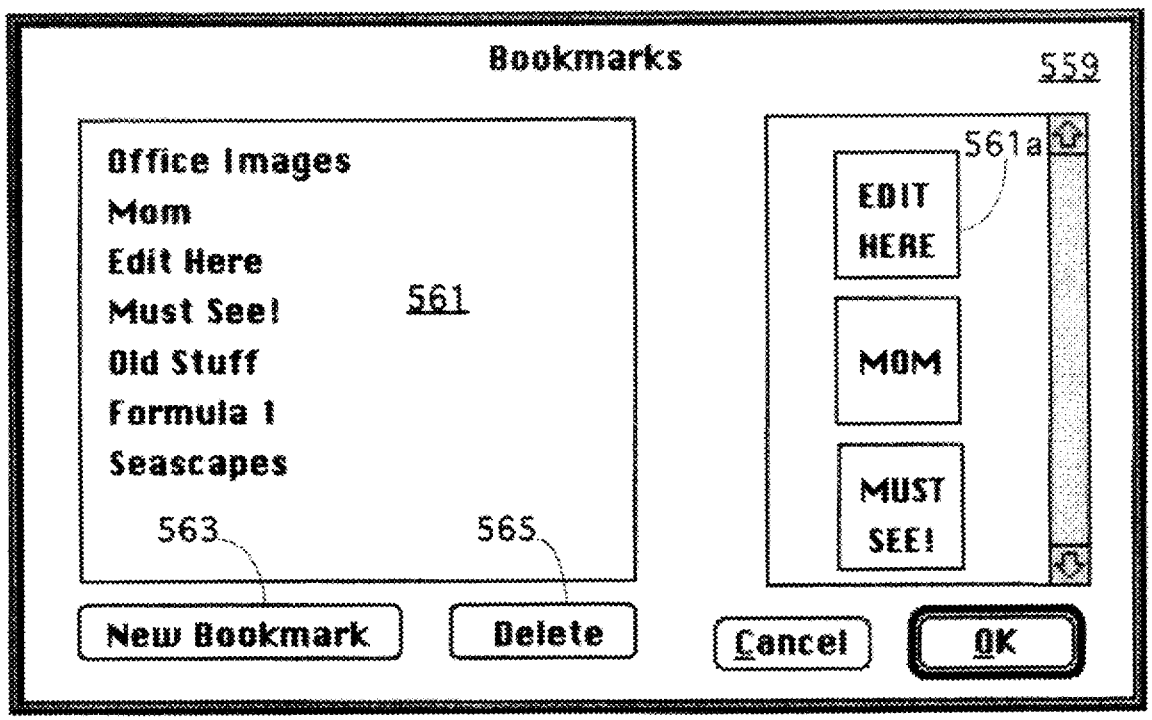

FIG. 5h shows one embodiment of an interface element 559 used for adding or modifying a bookmark. In the preferred embodiment, the user is able to maintain a collection of distinct bookmarks 561, each representing a different semantic expression meaningful to the user. The user may create 563, modify and delete 565 bookmarks, as desired. As an example, a bookmark may be used to indicate locations in an video sequence to be edited, such as bookmark 561a, or may significant images that the user would like ready access to at a later time. The user places the bookmarks 561 in specific images as desired. The bookmark 561 can then be searched for along with other image attributes. Bookmarks 561 can be represented with by text, graphical icons, or the like. When used to annotate video sequences, a bookmark 561 may be set to appear on image or sequence of images.

Figure 5I:
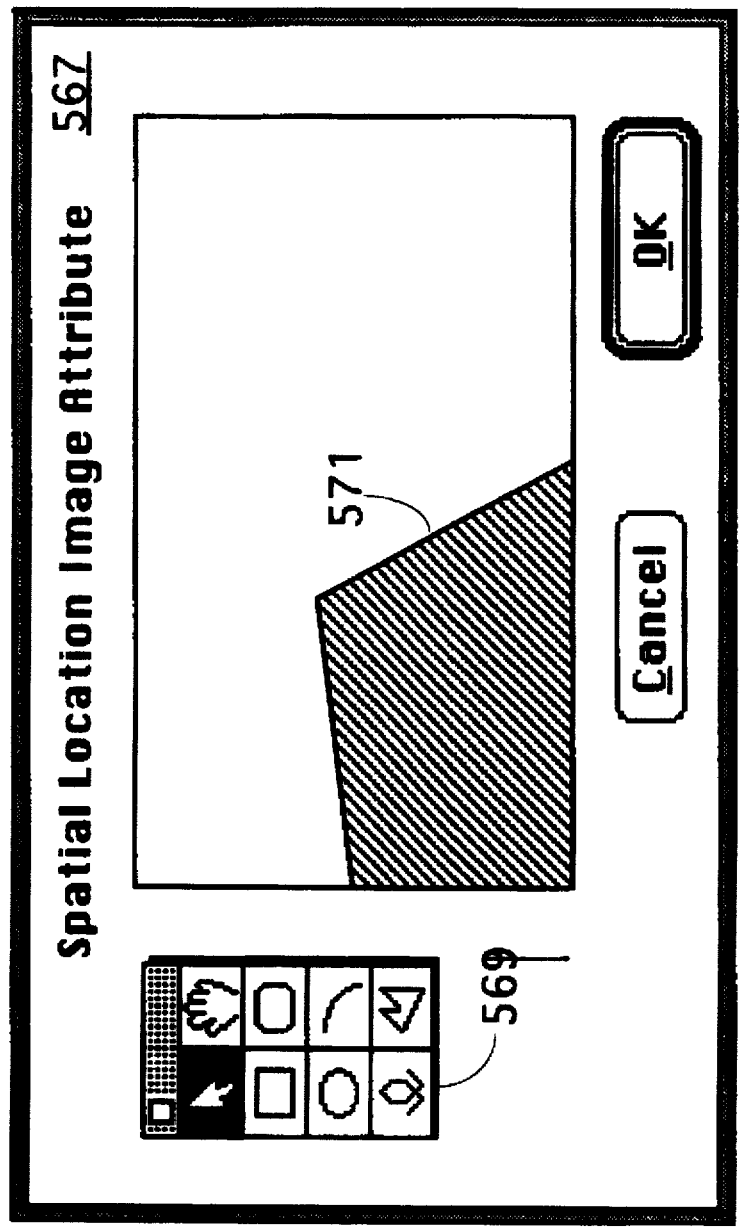

FIG. 5i shows one embodiment of an interface element 567 for modifying the parameters of a spatial location image attribute. In the preferred embodiment the user manipulates various drawing-like tools 569 to designate an area of the image in which the other image attribute is to appear. Thus the user may use a rectangle tool to designate a rectangular area in an image, such as the lower right hand quadrant. The spatial area may have an irregular outline 571 as well. Shading may be used to indicate to the user the area of the image that is defined by the spatial location image attribute.

After a user has input the various parameters for a selected image attribute, the icon 503 in the user playground 500 representing the image attribute is visually changed to represent the parameter modification. Referring again to FIG. 5b, the user has specified for the color image attribute a particular color, such as light blue. This parameter modification is represented visually by updating the icon 503b in the user playground 500 with the selected color (here represented by the shading of icon 503b). Similarly, different textures have been specified for each instance of the texture image attribute in icons 503c, one representing smooth texture and one representing a rippled texture. In each instance the selected texture is visually displayed with the icon 503 to inform the user of the parameter modification. Finally, the spatial image attribute has been modified to designate a spatial placement in the upper portion of the image, and so this spatial relationship is illustrated in miniature using the boundaries of the icon 503d as representative of the boundaries of the image.

In addition to specifying individual image attributes by selecting representative icons 503 from a palette 501, and modifying their individual parameters, the user is also able to define logical relationships between image attributes, such as conjunctive and disjunctive relationships. These relationships are defined using a conjunction tool represented by icon 505b, and a disjunction tool, represented by icon 505a. The disjunction tool allows the user to specify that either of a selected group of image attributes should appear in the target image. The conjunction tool allows the user to specify that all of a selected group of image attributes should appear in the target image. In the preferred embodiment conjunction is graphically represented by encircling the selected image attributes, and disjunction is graphically represented by a doubled arrow connecting line between pairs of image attributes. In FIG. 5b, the conjunction tool has been used to conjoin all of the image attributes the user has selected by drawing a circle 509 around the icons 503. The disjunction tool has been used to disjoin the two texture image attributes by connecting their icons 503c with a connecting line 511. Thus the overall search inquiry constructed here may be expressed as:

(color(H[150°, 245°]; S[0.05, 0.70]) and location(y<240) and (texture(smooth) or texture(rippled))

where each image attribute is listed as image attribute (parameter list). This search inquiry has the semantic meaning, as intended by the user, of "blue sky," and would be employed by the user to identify images having a blue sky background. (It is noted that there may be more than one range of values for each image attribute, such as the color image attribute may be specified with multiple hue and saturation values that are automatically read from the color threshold file.) By using selected image attributes, providing their parameters, and defining a relationship, the user is able to represent complex semantic expressions visually, and search for images that match the semantic expression. Using this method, the user will be able to locate images, having, for example, a blue sky, without such images being textually annotated ahead of time to indicate that feature. The user is able to search raw, previously unreviewed video footage or digitized photographs and still locate the desired images, thereby saving considerable time and resources in compiling an image database 113.

The example inquiry of FIG. 5b is but only one of many possible inquiries that can be constructed using the various image attributes and relationship tools. In addition, the particular visual effect associated with the conjunction tool or the disjunction tool may be changed in other embodiments, for example, using connecting lines to represent conjunction and a selection marquee to represent disjunction. The numerous different graphical realizations of these tools all come within the scope of the invention.

Figure 6:
FIG. 6 is an illustration of a custom image attribute icon.

In addition to using the image attributes supplied by the system, the user is able to define new image attributes by combining existing image attributes using the s above described techniques. For example, the user may a need to repeatedly locate a "blue sky" in the image database 113. Instead of entering the search inquiry from scratch each time, the user may define the search inquiry as a custom image attribute, and designate it "Blue Sky". This is done by selecting icon 503j from the palette 501, whereon a new window is provided in the display for the user to define the search inquiry for the custom image attribute. The new custom image attribute is permanently stored in the image attribute library and is available for inclusion in other search inquiries. In the preferred embodiment, a new icon 503j will be created to represent the custom image attribute, and will combine, where possible, the graphical elements of the underlying image attributes' icons. Icon 503k in FIG. 6 illustrates one possible representation of a custom image attribute for the set of "blue sky" image attributes. Alternatively, the user may design their own icon 503j to represent the custom image attribute. Instead of having a separate user interface element for modifying the parameters of a custom image attribute, when user selects the custom image attribute the system displays the set of underlying image attributes that comprise the custom image attribute. The user may then modify the custom image attribute using the interface elements described above.

Figure 7:
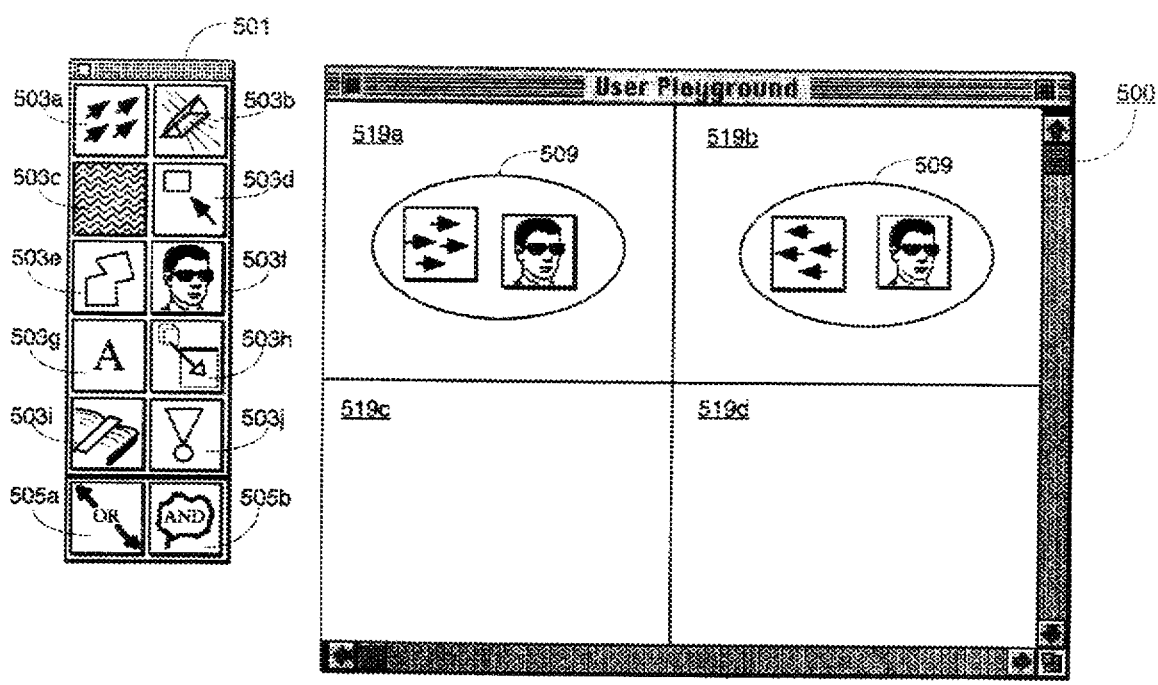
FIG. 7 is an illustration of a user interface for constructing a search inquiry for video sequences.

The construction of search inquiries is not limited to the purpose of locating image attributes that occur spatially in a given image or video frame. Search inquiries may also define sequential occurrences of image attributes in video sequences of images. Thus, the user may define one set of image attributes (or merely a single image attribute) to appear in a first scene (where each scene comprises a continuous set of substantially similar images) and a second set of image attributes (or a single image attribute) to appear in a second scene immediately following the first scene. For example, FIG. 7 shows the user playground 500 divided into four panels 519, each panel representing a scene in a video sequence. The search inquiry illustrated in the figure is an inquiry to locate an image of a human face moving from the left to the right in a first scene (thus the conjunctive relationship indicated by the circle 509) followed by a human face moving from right to left in a next scene. Accordingly, when the image database 113 is searched, only those video sequences having a human face moving in the specified directions will be retrieved. These types of search inquiries can be extended to any number of scenes. Individual scenes may be represented in a variety of ways other than dividing the user playground into panels 519; for example, a separate user playground 500 window may be created for each scene, and the user may specify the ordering of the windows to indicate the ordering of the scenes.

Figure 8:
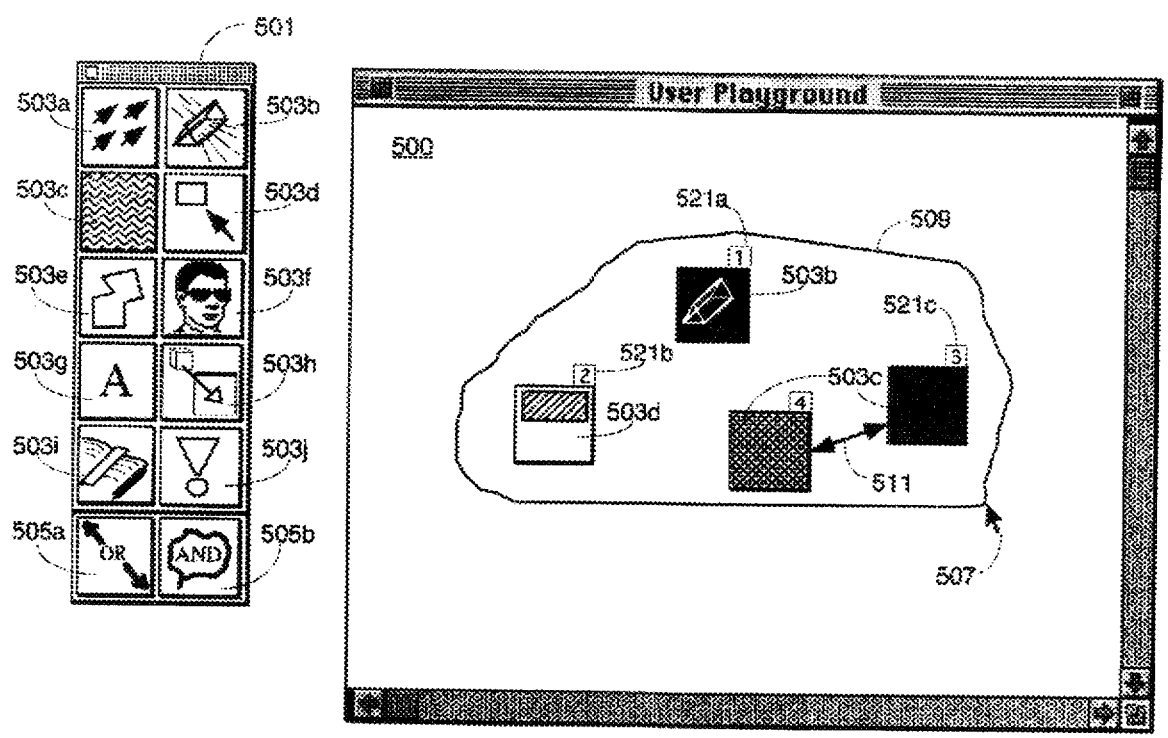
FIG. 8 is an illustration of a sample search inquiry constructed in the user interface.

Finally, because a user may differently value the relative importance of various image attributes in his search inquiry, the system 100 provides a means for ranking each image attribute used in a search inquiry. That is, the user is able to assign a numerical rank to each image attribute in the search inquiry, each ranking value used as coefficient to weight the image attribute for a particular image. Higher weighted image attributes will contribute relatively more to the overall determination of whether a particular image is a good match for the search inquiry. FIG. 8 illustrates one embodiment of a user interface for providing the ranking of image attributes. Visually attached to each icon 503 is a ranking box 521 that contains a user input ranking value for the image attribute. The user can choose to display or not display the ranking boxes, as needed. The ranking values may be input into the ranking boxes in a variety of ways, from selecting the icons 503 into a desired order, such that the first selected icon is given the ranking value of "1", the next is given the ranking value of "2" and so. Alternatively, the user may select a ranking box 521, thereby allowing direct text input of an integer value from a keyboard 111 or similar device for numeric entry. This latter option may be used to allow different image attributes to have the same ranking value. The image search system 100 can be configured to use low numerical values as high ranking values, or vice versa. In either scheme, the system 100 normalizes the ranking values such that the total sum of all the ranking values equals 1. For example, where ranking values from 1 to z are used, with 1 being the highest ranking value, then each ranking value $R_i$ equals:

$$\left[\frac{\sum_{i=1}^{z} R_i}{R_i}\right] / \sum_{i=1}^{z}\left[\frac{\sum_{i=1}^{z} R_i}{R_i}\right]$$

The ranking values are then used as coefficients for each of the image II attribute difference measures determined during the high level analysis.

User interface devices, other than a ranking box, that provide entry of a ranking value for each image attribute are also within the scope of the invention.

Figure 9:
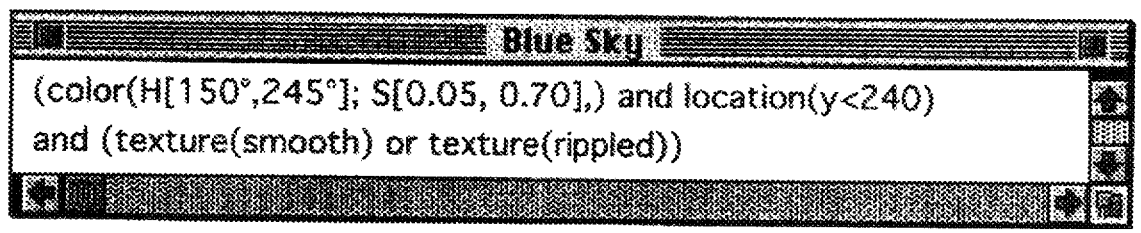
FIG. 9 is an illustration of a text window for viewing a textual description of a search inquiry.

In the preferred embodiment, the user interface further provides an editable and savable text window that contains a text output equivalent of the search inquiry formed in the user playground. An example of such a window is shown in FIG. 9. Each image attribute in the search inquiry is specified along with its parameters, and its logical relationship with any other image attributes, In addition, any ranking for an image attributes is also included in the text output. This window allows a user to further refine the search inquiry using text commands, should that mode of interaction be more acceptable to the user.

C. Effecting High Level Search for Image Attributes

Referring again to FIG. 2, once the user has constructed a search inquiry, the high level analyzer 123 then analyzes 209 the side information files 115 of the image database 113 to retrieve images that match the image attributes in the search inquiry. In order to effect the search, the high level analyzer 123 parses 207 the search inquiry to identify both the individual image attributes that are contained therein, along with their respective parameters, and any logical relationships specified for such image attributes. In addition, the high level analyzer 123 determines any ranking values the user has assigned to the image attributes. In the preferred embodiment, each image attribute is stored as a structure, with the parameters and ranking value stored as attribute variables for the instance of the image attribute; other methods for storing image attributes may also be employed.

Parsing 207 the search inquiry creates sets of image attributes for which the high level analyzer 123 will evaluate the side information files 115 to determine a correspondence or match between the appropriate side information file and the input image attribute. For example, the search inquiry (color(H[150°, 245°]; S[0.05, 0.70]) and location(y<240) and (texture(smooth) or texture(rippled))

may be parsed into two separate search inquiries:

(color(H[150°, 245°]; S[0.05, 0.70]) and location(y<240) and texture(smooth)

and (color(H[150°, 245°]; S[0.05, 0.70]) and location(y<240) and texture(rippled).

The high level analyzer 123 determines that the color histogram, and texture side information files 115 need to be analyzed 209 for this search inquiry.

The order in which the high level analyzer 123 analyzes 209 the side information files 115 depends on the logical structure of the search inquiry, and the particular image attributes in the search inquiry. If there is a logical precedence stated or implied in the search inquiry, then the side information files 115 are analyzed 209 according to that precedence. In addition, the side information files 115 are evaluated relative to the results of each prior evaluation. For the image attributes in a conjunctive term, one of the image attributes is evaluated first for all images in the image database 113. For the evaluation of a second image attribute, only those images corresponding to positive matches for the first image attribute are evaluated with respect to the second image attribute. Each subsequent image attribute is thus evaluated only for those images that correspond to the prior image attributes, thereby narrowing the search space, and reducing the search time of the system. In alternative embodiments, each image attribute is evaluated for all images in the image database 113, and then the logical relationships in the search query are evaluated for all the image attributes.

If there is no express precedence in the search inquiry, the side information files 115 are evaluated based on statistics built up by the system 100 on the optimal term evaluation strategy in the past. Alternatively, the side information files 115 may be analyzed based on the computational requirements associated with each type of side information file, with less computationally intensive side information files being evaluated first. Other considerations may also used to determine the order of evaluation of the image attributes and side information files 115 such as evaluating color image attributes prior to texture or motion, or evaluating text image attributes before all others. These orderings are used to improve performance by evaluating those image attributes that have either the greatest immediate semantic value and likeliness of accurate reflection of the user's intended meaning for the search query, or that require the least amount of computational power to evaluate, thus leaving those attributes that take more computational resources for evaluation over the smallest potential search spaces. Thus, in the prior example, the color histogram side information file would be evaluated first, and all images containing color(H [150°,245°]; S[0.05, 0.70]) would be identified, since color is a very strong indicator of a correct match of a "blue sky" (where this is the hue and saturation setting for the color of a blue sky) and a user is most likely to accurately specify the color of a "blue sky" when constructing the search inquiry.

Once the search inquiry has been parsed 207, and the order of evaluation of the image attributes and side information files 115 is determined, the high level analyzer 123 then evaluates 209 the side information file 115 corresponding to each image attribute. If there is no side information file 115 or image data available 208 for an image (such as where the image or video sequence was recently added to the database and has yet to be processed as described above), then the low level analyzer 121 is called to produce the appropriate side information file 115 or image data for the image or video sequence.

The evaluation 209 of the side information files 115 for determining whether an image corresponds to an input image attribute(s) is not a binary evaluation, that is, a determination that the image either does or does not contain the image attribute. Rather, in the preferred embodiment, the evaluation determines the degree with which an image corresponds to an image attribute. The evaluation 209 is performed by comparing each image attribute with the image data for the image appropriate side information file 115, and taking a difference measure D based on the value of the image attribute and the image data of each image in the side information file 115 corresponding to the image attribute. The difference measure D indicates how similar the image attribute is to some perceptual or statistical measurement of an image.

From the difference measure $D_i$ of each image attribute i of an image k the system generates an overall similarity measure $S_k$ is taken as a function that is inversely related to the weighted sum of image attribute difference measures $D_i$:

$$S_k = F\left[\frac{1}{\sum_{i=1}^{i=n} R_i D_i}\right]$$

where $D_i$ is the difference measure for each image attribute i in the search inquiry, and $R_i$ is the ranking value for the image attribute i (1 if not specified by the user). The difference measure for a conjunctive term is the minimum $R_i D_i$ value of any of the conjuncts. For disjunctive terms, the maximum $R_i D_i$ value of the disjuncts is s used. For example, for the search inquiry:

(color(H[150°, 245°]; S[0.05, 0.70]) and location(y<240) and texture(rippled).

the overall similarity measure S for each image will have the form:

$$\min[\min(R_c D_c \text{ and } R_L D_L) \text{ and } R_T D_T]$$

where $D_c$ the difference measure for the color image attribute of a given image, and $R_c$ is the normalized ranking value for that image attribute.

The difference measure of each image attribute is generated using a coarse to fine search strategy based on the pyramid of resolutions produced by the low level analyzer 121. Specifically, for each side information file 115 that is evaluated for a given image, the high level analyzer 123 begins with the side information file 115 generated from the lowest resolution sampling of the image. The high level analyzer 123 produces a difference measure between the image data generated from this sampling and the image attribute in the search inquiry.

If the difference measure $D_i$ exceeds a threshold value, then no further evaluation of the side information file 115 for that image is performed, and the next image is evaluated. If the difference measure $D_i$ is below the threshold, then the side information for the next level of resolution is evaluated, again producing a difference measure. This process is repeated until the difference measure $D_i$ exceeds the threshold for that image attribute. The difference measure is then returned by the high level analyzer 123 as the measure to which the image is similar to the desired input image attribute.

Figure 10:
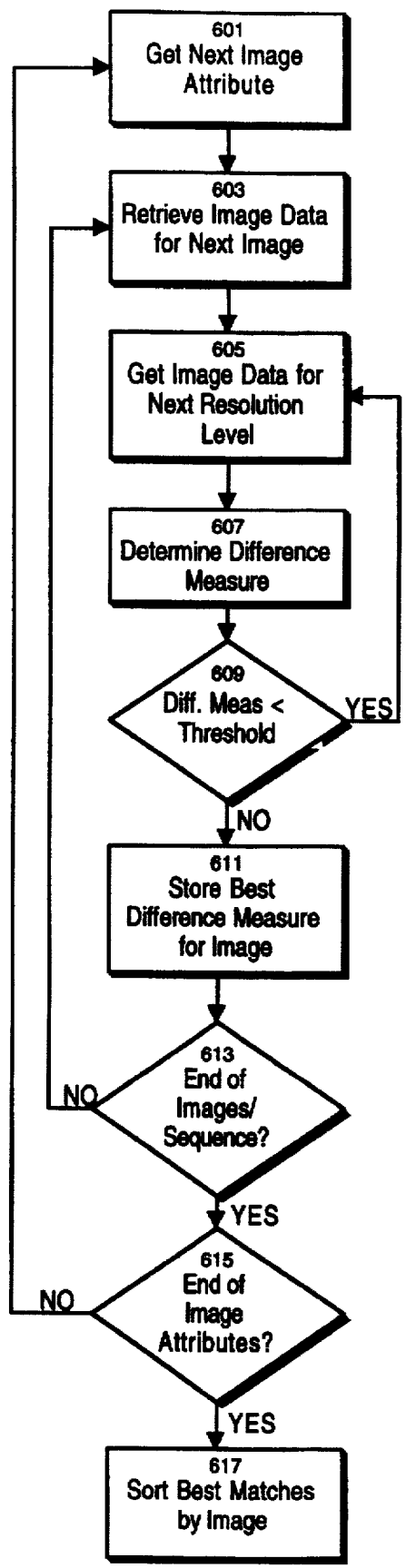
FIG. 10 is a flowchart of the analysis function of the high level analyzer.

FIG. 10 shows a flowchart of one embodiment of the analysis 209 function of the high level analyzer 123. This analysis 209 begins after the high level analyzer 123 has parsed 207 the search inquiry and determined the order for evaluating the image attributes and side information files 115. Accordingly, the first image attribute is determined 601, and the side information file 115 corresponding to the image attribute is determined. The image data of some first image is retrieved 603. The lowest level resolution image data is obtained 605, and the difference measure is determined 607 between the parameter value of the image attribute and the image data. If the difference measure is less than 609 the threshold, then the difference measure is stored 611 as the best measure for that image. If the difference measure is less than the threshold, then the next higher level resolution image data is retrieved 605, and a new difference measure determined 607 and tested 609. This process is repeated until either the difference measure exceeds the threshold, or all of the image data for the image has been evaluated, thereby producing the best measurement for the image. The use of the multiple resolution levels thus allows many images to be analyzed very quickly because the difference measure exceeds the threshold on the first pass, which is the least computationally intensive. The high level analyzer 123 tests 613 for any further images in the side information file 115, repeating the analysis from step 603 for each. Once the side information file 115 has been reviewed, then the high level analyzer 123 tests 615 whether there are any further image attributes to analyze, and repeats the process for each.

Alternatively, the coarse to fine search strategy can be implemented as follows. Instead of evaluating each image at each level of resolution before proceeding to the next image, the high level analyzer 123 may evaluate all of the images at the lowest level of resolution first for the image attributes in the search inquiry. This will reduce the search space by some proportion, since a number of images will be screen out as exceeding the minimum difference measure thresholds. The high level analyzer 123 will then evaluate the remaining images at the next higher level of resolution, again, reducing the search space. This process is repeated until all of the available levels of resolution in the image data have been evaluated for the image attributes in the search inquiry. The advantage of this approach is that the evaluation of all of the low level image data is relatively rapid, and can quickly reduce the number of images that must be evaluated in each of the remaining stages.

As an example, with an input motion image attribute, the high level analyzer 123 retrieves from motion side information file the image data of each image in turn. The side information file of each image contains, as described above, various sets of motion vectors, each associated with a specific level of resolution in the image. Beginning with the motion vectors determined from the lowest resolution sampling of an image, the high level analyzer 123 compares the motion vector value specified in by the parameters of the motion image attribute with the motion vectors for the image. If the difference measure between these motion vectors is below a preset threshold, then the input motion vector will be compared to the motion vectors obtained for the next higher resolution sampling of the image. This comparison process is repeated until the difference measure between the input motion vectors and the image motion vectors exceeds the threshold, the high level analyzer 123 returning the difference measure for the motion vector that did not exceed the threshold value. The high level analyzer 123 then repeats this analysis for each image for which motion image data is available. Alternatively, the high level analyzer 123 can perform the above analysis of higher resolution motion vectors by computing them from the low resolution motion vectors, using conventional techniques.

Texture image attributes are evaluated in a similar fashion, with the parameters of the input texture image attribute being iteratively compared to the side information files 115, and a difference measure being determined at the various levels of resolution.

For some image attributes, other types of evaluations are performed. Where the user has specified a color image attribute having a particular value, such as color(H[150°, 245°]; S[0.05, 0.70]), the analysis is essentially the same, except that the coarse to fine approach is not used. Instead, the high level analyzer 123 compares this color image attribute parameter value to the color histogram of each image, to determine whether the color histogram for each image includes the specified color value. For a color image attribute, the high level analyzer 123 returns as a difference measure a percent value equal to the number of pixels in the image having the specified color or colors (as determined by the color histogram) divided by the total number of pixels in the image. The difference measure for a spatial location image attribute is computed similarly, with the high level analyzer 123 ignoring any image data outside of the region indicated by the parameters of the spatial location attribute. In the above example, for the spatial location image attribute with a parameter of (y>240), the high level analyzer 123 only evaluates those pixels having the appropriate y axis value, recomputing the color histograms for the appropriate area if necessary.

For text image attributes, the text input of the image attribute is compared, using conventional word and text matching techniques, to any text stored in the text annotation files. Similarly, for bookmarks, these are compared with the bookmark file for identically matching bookmarks that the user has previously provided for selected images.

For bookmarks, the high level analyzer 123 locates those images in the image database 113 that have the specified bookmark.

When the search inquiry contains a face image attribute, there are two possible alternative analysis that the high level analyzer 123 performs. If the face image attribute is included with any importation of a particular face image from an existing source, then the user is deemed to be looking merely for those images known to have any face at all. Accordingly, the high level analyzer 123 can access the face side information file 115 retrieve the identity of images having faces directly, as the low level analyzer 121 has already determined which images include faces. However, if the user has imported into the face image attribute a particular face, then the high level analyzer 123 must analyze each of the images identified in the face side information file 115 to determine if it matches the input face. This evaluation creates a difference measure which is used as described above at step 605 (FIG. 10) to retrieve the matching images.

The difference measure for detecting a matching face is determined using eigen-images to compare the face image attribute with the image data in the face side information file 115. The concept is that an image containing an object may be represented by a set of n eigen-images $E_i$ and a set of n weights $w_i$ such that the image is the combination of all eigen-images according to their weights. That is, image I equals:

$$\sum_{i=0}^{n} E_i w_i$$

Figure 11:
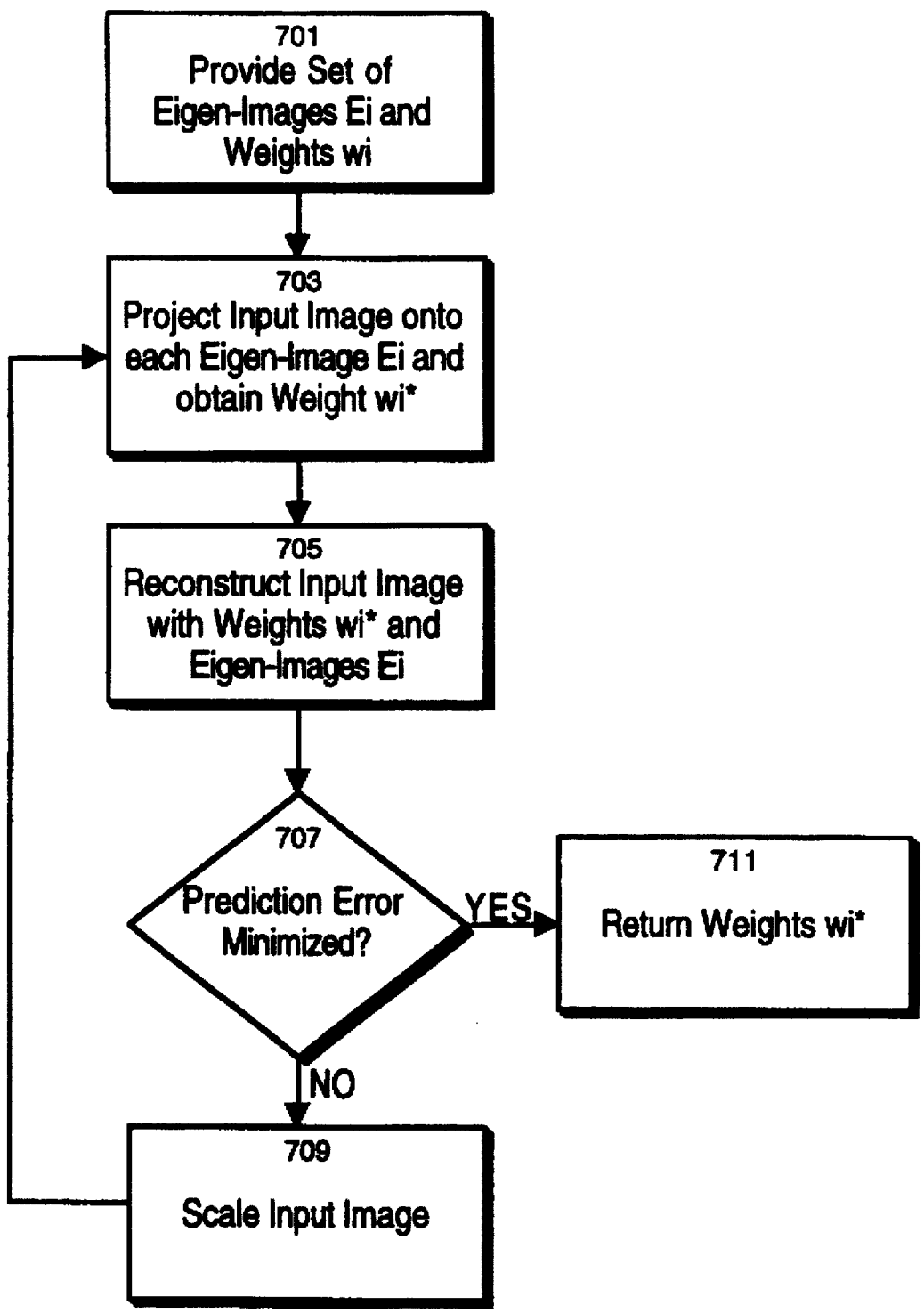
FIG. 11 is a flowchart of the method for identifying an object in an input image using eigen-images.

FIG. 11 shows a flowchart of the method for identifying an object in an input image using eigen-images. In order to identify a particular object in an input image, such as a face or other object, a set of fixed scale eigen-images $E_i$ and weights $w_i$ is provided 701 for an object image, that is, an image containing the object to be located in the input image. The eigen-images and weights are created by training the high level analyzer 123 on a representative set of images for a given object image, such as a set of human faces.

The input image is projected 703 onto each eigen-image $E_i$, and a weight $w_i*$ is obtained for each eigen-image $E_i$. The input image is obtained at step 605 in FIG. 10 at the selected level of resolution. The input image is then reconstructed 705 forming reconstructed image $\hat{I}$ from all the eigen-images Ei with the new weights $w_i*$. At this point conventional image identification techniques have relied on merely threshold comparisons between the reconstructed image and the object image to determine if the object is present in the input image. However, merely comparing the reconstructed image $\hat{I}$ with the object image is insufficient to determine whether the input image contains the object. This is because the scale of the input image may be different than the scale of the object image. Thus, conventional techniques which have relied on merely thresholding or the manual manipulation of scale are unreliable for identifying an object in the input image unless the scale of the two images is substantially the same.

The present invention overcomes this deficiency by iteratively rescaling the input image such that it is best approximated by the set of eigen-images $E_i$. Thus the reconstructed image $\hat{I}$ is compared to the object image by taking the sum of the squared pixel to pixel difference between object image and $\hat{I}$. This reconstruction error is dependent on the scale error, assuming other quantities such as translation and illumination are correct. When the reconstruction error is minimized, then the best approximation of the scale and presence of the object image has been reached, and the weights $w_i*$ are returned and stored in the object side information file. The reconstruction error is minimized as follows.

After a first reconstruction error $e_1$ is generated as described (or using other equivalent difference measures), the high level analyzer 123 scales the input image, preferably increasing the resolution of the input image by upsampling by a preset sampling factor (such as sampling every 2 bits as 7 bits). The scaled input image is again projected on the eigen-image set to generate another set of weights $w_i*$. Another reconstruction error $e_2$ is then determined. After several reconstruction errors $e_n$ have been created, preferably at least 3, the direction of change between the errors is determined, indicating whether the reconstruction errors are increasing or decreasing. If the reconstruction errors are increasing, then the low level analyzer 121 is scaling in the wrong direction, and the input image is then resampled at a lower resolution. If the reconstruction errors are decreasing then low level analyzer 121 is moving the scale in the correct direction, and the input image can continued to be upsampled. This method allows the high level analyzer 123 to quickly obtain the correct scale for an input image. When the reconstruction error is minimized, it is returned as the difference measure for the image attribute, and processed as described above.

The foregoing identification method can be used for any "object" or image attribute that can be represented by a set of eigen images Ei and a set of weights $w_i$, such as particular texture patterns, colors patterns, gradients, any defined region of pixels, and the like, or any combination thereof. In addition to normalization of scaling, the reconstruction errors can be employed to normalize translations, rotations, or other operations on the input image.

Once a similarity measure S is determined for each image, they are sorted 617 by decreasing value, such that the images that are most similar to the search inquiry, and thus have the highest S value, are ordered first. Each ranking value R weights its respective difference measure $D_j$, so that highly ranked image attributes will contribute more to the S value of each, and thus the ordering will reflect the influence of those image attributes.

D. Display of Retrieved Images

After the high level analyzer 123 evaluates 209 the appropriate side information files 115 from the image database 113, and determines the ordering of those images that are substantially similar to the image attributes in the search inquiry, it passes identifying information, such as pointers or storage addresses of the images to the image display controller 129. The image display controller 129 displays 213 the images to the user on the display 103. Preferably, the image display controller 129 displays the best N image matches, such as the best 20 matches. The image display controller 129 retains in the memory a larger number of images, such as the entire retrieved set. That way, a simple reweighting of the image attributes can quickly result in a new calculation of S, and a new presentation of the top N matches. In the preferred embodiment, the images are displayed 213 in the order of their ordering of their overall similarity measures S.

The display 213 of the images can be ordered spatially, for example, from the upper left portion of the display, across to the upper right, and then down. Alternatively, the images can be ordered temporally by displayed one at a time to the user, in the order of their ranking, or by stacking a number of windows in the display, one for each of images. Where a retrieved image is contained in a video sequence of images, the image display controller 129 links displayed image to the underlying scene in the video such that the user is able to replay the scene containing the image by selecting the image with a pointing device 105. The image display controller 129 then retrieves the entire sequence of images in the scene from the image database 113.

E. Re-ranking of Image Attributes

Figure 12:
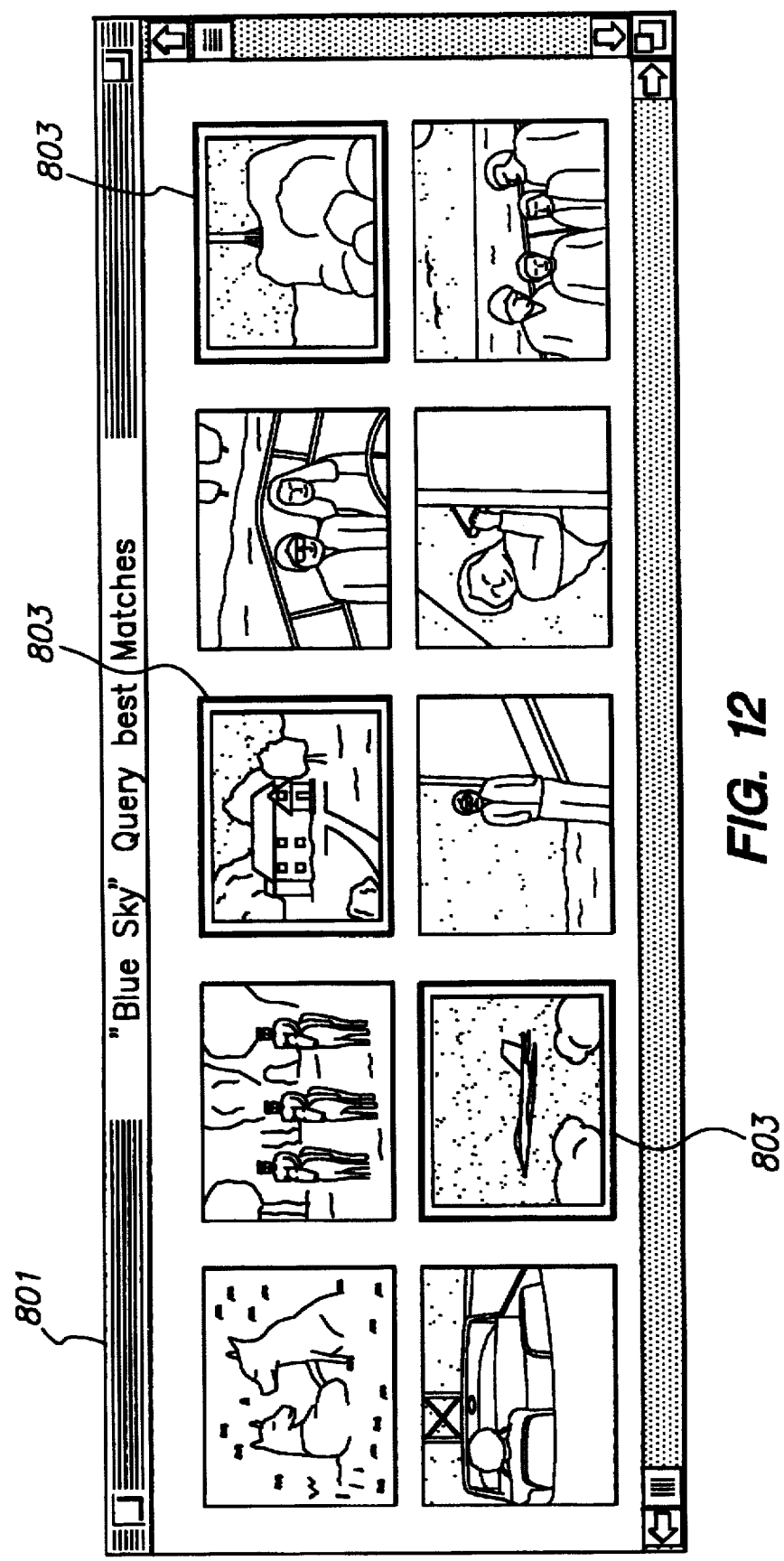
FIG. 12 is an illustration of a user interface element for designating images satisfactorily matching the search inquiry.

The system 100 of the present invention also provides a way for the user to refine a search inquiry based on the results obtained from initial evaluation of the search inquiry. In this way the user is able to improve the accuracy of the search. Specifically, upon reviewing the images retrieved by the high level analyzer 123, the user identifies which images accurately reflect the search inquiry by selecting the appropriate images, for example, by designating with the pointing device 105 the desired images, or by entering identifying information with the keyboard 111. FIG. 12 shows one example of a user interface element 801 for displaying a number of the images retrieved in response to a search inquiry, for example a "blue sky," search inquiry such as shown above, wherein a user has selected several images, shown by the highlighting 803, as satisfactory matches to the search inquiry.

Once the images are designated, the high level analyzer 123 then separately correlates the image attribute difference measures D of the image attributes for the designated images with the image attributes of the search inquiry. For example, the high level analyzer 123 will correlate the difference measure $D_C$ for the color attribute values in the selected images with a color image attribute in the search inquiry, and separately correlate the difference measure $D_M$ for the motion image attribute from the images with a motion image attribute in the search inquiry. The correlation value indicates how strongly the image attribute parameters correlate with the image data for the designated images. If the correlation value for an image attribute is high (e.g.>0.75), then the image attribute significantly contributes to identifying a desired image.

Once all of the appropriate image attributes have been correlated, the high level analyzer 123 re-ranks the image attributes in the search inquiry based on their correlation values, with the image attribute having the greatest correlation coefficient being ranked 1, followed by the image attribute having the second greatest correlation coefficient, and so on, for all of the input image attributes. The ranking values $R_i$ are normalized and recomputed, as described, increasing the weight for the highly correlated image attribute similarity measures.

Each of the new ranking values $R_i$ is compared with a threshold variance value $\gamma_i$ appropriate for the image attribute i being weighted; alternatively $\gamma_i$ can be determine empirically. The variance value for each image attribute sets a floor value. If a ranking value is less than its corresponding variance value, then the image attribute is not significantly contributing to the overall search inquiry. Accordingly, the images selected by the user are more representative of the correct value for that particular image attribute. In this case, the high level analyzer 123 computes the average image attribute parameter value for the image attribute from the image data of the images selected by the user over all the previous iterations. The high level analyzer 123 then resets the parameters of the image attribute in the search inquiry to the new average value for that image attribute. The high level analyzer 123 then performs the analysis 209 again on that particular image attribute, by evaluating the appropriate side information file. This will result in a new overall similarity measure S for each image evaluated. This produces a new set of images, which are displayed to the user, as above.

If a ranking value $R_i$ is greater than its variance value, then the image attribute contributes to the overall search inquiry, and only the relative weight that the image attribute contributes to the overall similarity measure S needs to be changed. Accordingly, the difference measure $D_i$ for each image is reweighted with the new ranking value $R_i$, and a new overall similarity measure S for each is recomputed for the existing set of images, and these values are sorted 617. In this case, no new high level analysis is performed, but rather, the currently retrieved images are reordered for display based on the new weightings for the image attributes derived from the new ranking values.

For example, suppose that a search inquiry contained a color image attribute with a ranking value of 1, a motion image attribute with a ranking value of 2, and a texture image attribute with a ranking value of 3. Upon retrieval of the images the user will designate those images that most closely match the desired results for the search inquiry. The high level analyzer 123 will then correlate the difference measures D for the image attributes of the designated images with the color, motion, and texture image attributes parameters in the search inquiry. This may determine, for example, that the color image attribute of the search inquiry has a correlation coefficient of 0.3 with the color image attributes of the designated images, the motion image attribute has a correlation coefficient of 0.8, and the texture image attribute has a correlation coefficient of 0.5.

Accordingly, high level analyzer 123 re-ranks the image attributes of the search inquiry, giving the motion image attribute a ranking value of 1, the texture image attribute a ranking value of 2, and the color image attribute a ranking value of 3. Thus, while the user originally believed that the color image attribute was the most significant aspect of the image, based on the designation of the image following retrieval, it turned out that motion was most significant, followed by the texture image attribute. If any of these new rankings, which are normalized as described above, are less than their corresponding variance threshold, the high level analyzer 123 will reset the appropriate image attribute parameters of the search inquiry to the average image attribute value of the images, and then reevaluate 209 the image database 113 to find images that correspond to the newly ranked image attributes. Otherwise, the high level analyzer 123 will recompute the overall similarity measure S of the originally retrieved images (including the images retrieved but not displayed), sort 617, and resubmit them to the image display controller 129 for display in a new order.

At this point the user may again select appropriate images, and repeat this process, each time further refining the rankings of the search inquiry. The user may also at these time modify the parameters of any of the image attributes in the search inquiry, or may add other image attributes as desired. Alternatively, the user may choose to reset the parameters of the input image attributes to the parameters of either the image that is a "best match" or to an average of the parameters of the designated images, or some other function of the returned set of images.

We claim:

1. A computer implemented method for retrieving selected images from a plurality of images using a graphically defined inquiry, the method comprising the steps of:

analyzing each of the plurality of images to produce image data for each image;

receiving at least one input specifying an inquiry containing at least one image attribute;

analyzing the image data for the images by comparing the image attributes to the image data to determine selected images that are substantially similar to the image attributes in the inquiry; and retrieving the selected images from the plurality of images.

2. The method of claim 1, wherein the step of analyzing each of the plurality of images, further comprises the step of:

determining at least one motion vector between pairs of selected images, the motion vector for each pair of images forming an image attribute for one of the pair of images.

3. The method of claim 1, wherein the step of analyzing each of the plurality of images, further comprises the step of:

determining at least one color histogram for each image, each color histogram forming an image attribute of the image.

4. The method of claim 1, wherein the step of analyzing each of the plurality of images, further comprises the step of:

determining for pairs of selected images a frame difference between the selected images.

5. The method of claim 4, wherein the step of determining for pairs of selected images a frame differences further comprises the steps of:

retrieving a first image and a second image in a pair of selected images, including luminance information for a plurality of pixels in each image, wherein each pixel in the first image corresponds to a pixel in the second image;

determining for each of the plurality of pixels in the first image a luminance difference between the pixel and the corresponding pixel in the second image; and accumulating the luminance differences to produce a prediction error for the first image.

6. The method of claim 1, wherein the step of analyzing each of the plurality of images, further comprises the steps of:

determining whether an image includes a predetermined object.

7. The method of claim 6, wherein the step of determining whether an image includes a selected object further comprises the steps of:

providing a template for the selected object, the template defining geometrical and statistical image characteristics of the selected object, and having a plurality of regions;

providing for each region of the template a property rule defining a threshold value for the image characteristic in the region of the template;

applying the template the image to produce a plurality of image regions corresponding to the template regions;

for each image region, determining a value for the image characteristic;

scoring the image according to the image characteristic values for all image regions to determine an image score;

providing a threshold image score representing a minimum score for an image known to contain the selected object;

comparing the image score to the threshold; and designating the image as containing the selected object if the image score exceeds the threshold.

8. The method of claim 1, wherein the step of analyzing each of the plurality of images, further comprises the step of:

identifying at least one scene in the plurality of images, the scene including at least one image or a set of temporally adjacent images, the scene including a beginning time and an end time.

9. The method of claim 1, wherein the step of analyzing each of the plurality of images, further comprises the step of:

identifying text annotation associated with an image.

10. The method of claim 1, wherein the step of receiving at least one input specifying an inquiry further comprises the steps of:

selecting at least two image attributes; and defining at least one relationship between selected image attributes.

11. The method of claim 10, wherein the step of defining at least one relationship between selected image attributes, further comprises the step of:

defining a logical relationship between the selected image attributes.

12. The method of claim 1, wherein the step of receiving at least one input specifying an inquiry further comprises the step of:

defining a new image attribute from selected image attributes contained in the search inquiry.

13. The method of claim 1, wherein the step of receiving at least one input specifying an inquiry containing at least one image attribute, further comprises the step of:

defining a spatial location for the image attribute.

14. The method of claim 1, where the image attributes are selected from a predetermined set of image attributes.

15. The method of claim 1, wherein each image attribute has parameters, the step of receiving inputs specifying an inquiry further comprises the step of:

modifying parameters of a selected image attribute to redefine the selected image attribute.

16. The method of claim 1, wherein:

the step of receiving at least one input specifying an inquiry further comprises the steps of:

selecting at least one image attribute for identifying in a first image or plurality of images; and selecting at least one image attribute for identifying in a second image or plurality of images; and wherein the step of retrieving the selected images further comprises:

retrieving the first image or plurality of images and the second image or plurality of images where the second image or plurality of images temporally follows the first image or plurality of images.

17. The method of clam 1, wherein:

the step of receiving at least one input specifying an inquiry further comprises:

defining a text item for a selected image attribute; and
the step of analyzing the image data further comprises the step of:
  identifying at least one selected image having a text annotation substantially similar to an text item defined for the selected image attribute.

18. The method of claim 1 wherein:
the step of receiving at least one input specifying an inquiry further comprises:
  defining a first motion vector representing a direction of motion for a selected image attribute; and
the step of analyzing the image data further comprises the steps of:
  retrieving a second motion vector from the image data of an image;
  determining whether the second motion vector represents a direction of motion substantially similar to a direction of motion represented by the first motion vector.

19. The method of claim 1 wherein:
the step of receiving at least one input specifying an inquiry further comprises:
  defining at least one color for a selected image attribute; and the step of analyzing the image data further comprises the steps of:
  retrieving a color histogram for each image;
  determining whether the color histogram for an image contains the at least one color represented by the selected image attribute in the inquiry.

20. The method of claim 1, wherein the step of receiving inputs specifying an inquiry further comprises the step of:
  assigning to each image attribute in the inquiry a ranking value.

21. The method of claim 20 wherein the step of retrieving images further comprises the steps of:
  determining a similarity measure for each retrieved image, and,
  displaying the retrieved images according to their similarity measures, wherein images with higher similarity measures are presented spatially or temporally before images with lower similarity measures.

22. The method of claim 21, wherein the step of determining a similarity measure for each retrieved image further comprises the steps of:
  determining a ranking value for each selected image attribute contained in the inquiry;
  determining for each selected image attribute a difference measure between the image data for the retrieved image and the selected image attribute;
  weighting each difference measure according to a ranking value of the selected image attribute producing the difference measure; and
  determining a cumulative value for the weighted difference measures, the similarity measure of the retrieved image being a function of the cumulative value.

23. The method of claim 20, further comprising the steps of:
  designating, in response to user selection, retrieved images representing an acceptable correspondence to the inquiry;
  selecting at least one image attribute in the inquiry;
  determining for each selected image attribute in the inquiry a correlation value between the selected image attribute and the image data for the designated images;
  ranking the image attributes according to their correlation values;
  constructing a new inquiry containing at the ranked image attributes; and
  re-analyzing the image data for the plurality of images using the new inquiry.

24. The method of claim 1, further comprising the step of:
  providing a graphical user interface for selecting image attributes in response to user inputs to specify an inquiry; and
  providing in the graphical user interface the retrieved images in a spatial order corresponding to a temporal ordering of the retrieved images in the plurality of images.

25. A computer implemented method for determining if an image contains a selected object, comprising the steps of:
  providing a template for the selected object, the template defining geometrical and statistical image characteristics of the selected object, and having a plurality of regions;
  providing for each region of the template a property rule defining a threshold value for the image characteristic in the region of the template;
  applying the template the image to produce a plurality of image regions corresponding to the template regions;
  for each image region, determining a value for the image characteristic;
  scoring the image according to the image characteristic values for all image regions to determine an image score;
  providing a threshold image score representing a minimum score for an image known to contain the object;
  comparing the image score to the threshold; and
  designating the image as containing the object if the image score exceeds the threshold.

26. A method of constructing a search inquiry for searching a plurality of images for a selected image, comprising the steps of:
  providing a plurality of distinctive icons, each icon representing a predefined type of image attribute, each image attribute having parameters;
  in response to user specification, selecting at least one icon to graphically define the search inquiry;
  storing the image attribute represented by each selected icon in the search inquiry.

27. The method of claim 26, wherein the plurality of icons are provided in a palette.

28. The method of claim 27, further comprising the steps of:
  in response to selecting an icon, automatically providing a user interface element for modifying parameters of the image attribute represented by the icon;
  in response to user specification, modifying the parameters of the image attribute represented by the icon;
  storing the modified parameters of the image attribute; and
  updating the icon representing the image attribute to visually reflect the modified parameters.

29. The method of claim 27, further comprising the step of:
  receiving a user input defining at least one relationship between selected icons;
  storing the relationship in association with each image attribute represented by each selected icon, and
  graphically representing the relationship between the selected icons.

30. The method of claim 29, wherein the relationship between selected icons is a conjunctive relationship.

31. The method of claim 29, where the relationship between selected icons is a disjunctive relationship.

32. The method of claim 30, where the relationship between selected icons is a spatial relationship.

33. The method of claim 27, further comprising the step of:

receiving a user input ranking selected icons, the ranking of each icon associated with the image attribute represented by the icon, producing at least one high ranking image attribute and at least one low ranking image attribute;

graphically representing the ranking of the icon; and storing the ranking of each icon in association with the image attribute represented by the icon.

34. The method of claim 27, further comprising the steps of:

selecting at least one image in response to user specification;

associating with the image a user designated custom marker, the custom marker represented by an icon, the custom marker including semantic information about the image as determined by the user; and including at least one icon representing a custom marker in the inquiry in response to user selection of the custom marker.

35. A system for searching images, comprising:

a storage device containing a plurality of images, and a plurality of icons representing image attributes;

a display coupled to the storage device for displaying the images and the icon;

a low level analyzer coupled to the storage device and retrieving therefrom selected images to produce from each selected image, image data, and storing the image data in the storage device;

a user interface controller coupled to a display and the storage device, and further coupled to an input device, the user interface controller retrieving the icons from the storage device and displaying the icons on the display, the user interface controller accepting signals from the input device designating selected icons on the display, and storing the image attributes represented by the selected icons in association with each other in the storage device to form a search inquiry;

a high level analyzer coupled to the storage device and retrieving therefrom the search inquiry and the image data, the high level analyzer comparing each image attribute in the search inquiry with selected image data to determine a relative measure of similarity between the image data and the image attribute, the high level analyzer retrieving a selected number of images substantially similar to the image attributes of the search inquiry.

36. A method for determining whether an input image of indeterminate scale contains a selected image portion having a fixed scale, the method comprising the steps of:

a) providing a set of eigen-images E, each eigen-image $E_i$ having an weighting factor $w_i$, such that the image portion is represented by a combination of all the eigen-images according to their respective weighting factors;

b) projecting the input image onto each eigen-image to produce a projected weighting factor for each eigen-image;

c) combining the eigen-images according to their respective projected weighting factors to produce a reconstructed input image;

d) comparing the reconstructed input image with the image portion to produce a reconstruction error;

e) resampling the input image according to the reconstruction error;

f) repeating steps b) through e) until the reconstruction error is minimized; and g) comparing the minimized reconstruction error with a threshold error associated with an image known to contain the image portion, wherein the input image contains the image portion if the minimized reconstruction error is less than the threshold error.

* * * * *